United States Patent
Bern

(10) Patent No.: US 10,665,439 B2
(45) Date of Patent: May 26, 2020

(54) METHODS AND APPARATUSES FOR DETERMINING THE INTACT MASS OF LARGE MOLECULES FROM MASS SPECTROGRAPHIC DATA

(71) Applicant: Protein Metrics Inc., Cupertino, CA (US)

(72) Inventor: Marshall Bern, San Carlos, CA (US)

(73) Assignee: Protein Metrics Inc., Cupertino, CA (US)

( * ) Notice: Subject to any disclaimer, the term of this patent is extended or adjusted under 35 U.S.C. 154(b) by 0 days.

(21) Appl. No.: 16/438,279

(22) Filed: Jun. 11, 2019

(65) Prior Publication Data

US 2019/0362952 A1    Nov. 28, 2019

Related U.S. Application Data

(63) Continuation of application No. 15/881,698, filed on Jan. 26, 2018, now Pat. No. 10,319,573.

(60) Provisional application No. 62/451,040, filed on Jan. 26, 2017.

(51) Int. Cl.
   *H01J 49/16*    (2006.01)
   *H01J 49/00*    (2006.01)

(52) U.S. Cl.
   CPC ........ *H01J 49/0036* (2013.01); *H01J 49/165* (2013.01)

(58) Field of Classification Search
   CPC .............................. H01J 49/0036; H01J 49/165
   See application file for complete search history.

(56) References Cited

U.S. PATENT DOCUMENTS

| 4,464,650 A | 8/1984 | Eastman et al. |
| 4,558,302 A | 12/1985 | Welch |
| 4,814,764 A | 3/1989 | Middleton |
| 5,343,554 A | 8/1994 | Koza et al. |
| 5,995,989 A | 11/1999 | Gedcke et al. |

(Continued)

FOREIGN PATENT DOCUMENTS

WO    WO2011/127544 A1    10/2011

OTHER PUBLICATIONS

Krokhin et al.; An improved model for prediction of retention times of tryptics peptides in ion pair reversed-phase HPLC: its application to protein peptide mapping by off-line HPLC-MALDI MS; Molecular and Cellular Proteomics; 3(9); pp. 908-919; Sep. 2004.

(Continued)

*Primary Examiner* — Eliza W Osenbaugh-Stewart
(74) *Attorney, Agent, or Firm* — Shay Glenn LLP

(57) ABSTRACT

Methods and apparatuses for the identification and/or characterization of properties of a sample using mass spectrometry. The method involves using a measured spectrum of data from a sample taken with a mass spectrometer, deconvoluting the measured spectrum of data by applying parsimony weighting to minimize the number of charge states based on one or more of: the number of intense peaks in the mass spectrum; the number of harmonic relationships (e.g., masses in small integer ratios); and the number of off-by-one relationships (e.g., m/z bins with high probability for two adjacent charges). Thus, the underlying m/z spectrum may be inferred from the family of plausible deconvoluted spectra determined by applying parsimony and the inferred m/z spectrum may be used to identify and/or characterize the sample.

21 Claims, 21 Drawing Sheets

1. Start with all charges equally likely

2. Compute deconvolved mass spectrum based on charges

3. Recompute charges based on deconvolved mass spectrum

4. Go back to Step 2 (iterate until convergence or repeat limit)

(56) References Cited

U.S. PATENT DOCUMENTS

| | | | |
|---|---|---|---|
| 6,094,627 | A | 7/2000 | Peck et al. |
| 6,393,393 | B1 | 5/2002 | Kawahara |
| 6,535,555 | B1 | 3/2003 | Bordes et al. |
| 6,798,360 | B1 | 9/2004 | Qian et al. |
| 6,906,320 | B2 | 6/2005 | Sachs et al. |
| 7,006,567 | B2 | 2/2006 | Frossard et al. |
| 7,283,684 | B1 | 10/2007 | Keenan |
| 7,283,937 | B2 | 10/2007 | Goldberg |
| 7,297,940 | B2 | 11/2007 | Bern |
| 7,400,772 | B1 | 7/2008 | Keenan |
| 7,402,438 | B2 | 7/2008 | Goldberg |
| 7,429,727 | B2 | 9/2008 | Bern |
| 7,496,453 | B2 | 2/2009 | Chau |
| 7,680,670 | B2 | 3/2010 | Lamblin et al. |
| 7,979,258 | B2 | 7/2011 | Goldberg et al. |
| 8,004,432 | B2 | 8/2011 | Kawato |
| 8,077,988 | B2 | 12/2011 | Donoho |
| 8,108,153 | B2 | 1/2012 | Bern |
| 8,428,889 | B2 | 4/2013 | Wright |
| 8,511,140 | B2 | 8/2013 | Gorenstein et al. |
| 8,598,516 | B2 | 12/2013 | Sapargaliyev et al. |
| 8,645,145 | B2 | 2/2014 | Subbaraman et al. |
| 9,385,751 | B2 | 7/2016 | Kletter |
| 9,571,122 | B2 | 2/2017 | Kletter |
| 9,640,376 | B1 | 5/2017 | Becker et al. |
| 9,859,917 | B2 | 1/2018 | Kletter |
| 10,199,206 | B2 | 2/2019 | Becker et al. |
| 10,354,421 | B2 | 7/2019 | Becker et al. |
| 2002/0068366 | A1 | 6/2002 | LaDine et al. |
| 2003/0031369 | A1 | 2/2003 | Le Pennec et al. |
| 2003/0200032 | A1 | 10/2003 | Keating et al. |
| 2003/0218634 | A1 | 11/2003 | Kuchinsky et al. |
| 2004/0102906 | A1 | 5/2004 | Roder |
| 2004/0160353 | A1 | 8/2004 | Cirillo et al. |
| 2005/0047670 | A1 | 3/2005 | Qian et al. |
| 2005/0063864 | A1 | 3/2005 | Sano et al. |
| 2008/0010309 | A1 | 1/2008 | Sugita |
| 2008/0260269 | A1 | 10/2008 | Thiagarajan |
| 2010/0124785 | A1 | 5/2010 | Bern |
| 2010/0288917 | A1 | 11/2010 | Satulovsky et al. |
| 2010/0288918 | A1 | 11/2010 | Satulovsky |
| 2011/0093205 | A1 | 4/2011 | Bern |
| 2012/0047098 | A1 | 2/2012 | Reem |
| 2012/0245857 | A1 | 9/2012 | Lee et al. |
| 2013/0080073 | A1 | 3/2013 | de Corral |
| 2013/0144540 | A1 | 6/2013 | Bern et al. |
| 2013/0226594 | A1 | 8/2013 | Fuchs et al. |
| 2013/0262809 | A1 | 10/2013 | Wegener |
| 2013/0275399 | A1 | 10/2013 | Amit et al. |
| 2013/0289892 | A1 | 10/2013 | Satoh |
| 2014/0045273 | A1 | 2/2014 | Cerda et al. |
| 2014/0164444 | A1 | 6/2014 | Bowen et al. |
| 2015/0319268 | A1 | 11/2015 | Callard et al. |
| 2016/0077926 | A1 | 3/2016 | Mutalik et al. |
| 2016/0215028 | A1 | 7/2016 | Mutharia et al. |
| 2018/0301326 | A1 | 10/2018 | Bern et al. |
| 2019/0043703 | A1 | 2/2019 | Bern et al. |
| 2019/0103260 | A1 | 4/2019 | Kil et al. |

OTHER PUBLICATIONS

Schreiber et al.; Using PeakView(TM) software with the XIC manager for screening and identification with high confidence based on high resolution and accurate mass LC-MS/MS; AB Sciex; Food & Environmental; (Pub. # 2170811-03); 5 pgs.; Apr. 2, 2011.

Thermo Fisher Scientific, Inc.; Thermo Xcaliber: Qualitative Analysis (User Guide); Revision B; 290 pgs.; Sep. 2010.

Valot et al.; MassChroQ: A versatile tool for mass spectrometry quantification; Proteomics; 11(17); 23 pgs.; Sep. 2011.

VanBramer; An Introduction to Mass Spectrometry; Wider University; 38 pgs.; ©1997; (revised) Sep. 2, 1998.

Waters Corporation; Biopharmalynx: A new bioinformatics tool for automated LC/MS peptide mapping assignment; 6 pages retrived May 17, 2018 from the internet (http://www.waters.com/webassets/cms/library/docs/720002754en.Pdf); Sep. 2008.

Waters Corporation; MassLynx 4.1 Getting started guide; 71500113203/RevisionA; 96 pages; retrieved May 17, 2018 from the internet (http://turroserver.chem.columbia.edu/group/instrument/HPLC/HPLC%20Getting%20Started.pdf) ; 2005.

Waters Corporation; QuanLynx User's Guide; Version 4.0; 125 pages; retrived May 17, 2018 from the internet ( http://www.waters.com/webassets/cms/support/docs/quanlynx_40.pdf); Feb. 15, 2002.

Yang et al.; Detecting low level sequence variants in recombinant monoclonal antibodies; mAbs 2 (3); pp. 285-298; May/Jun. 2010.

Ziv et al.; A universal algorithm for sequential data compression; IEEE Trans. on Information Theory; IT-23(3); pp. 337-343; May 1977.

Ziv et al.; Compression of individual sequences via variable-rate coding; IEEE Trans. on Information Theory; IT-24(5); pp. 530-536; Sep. 1978.

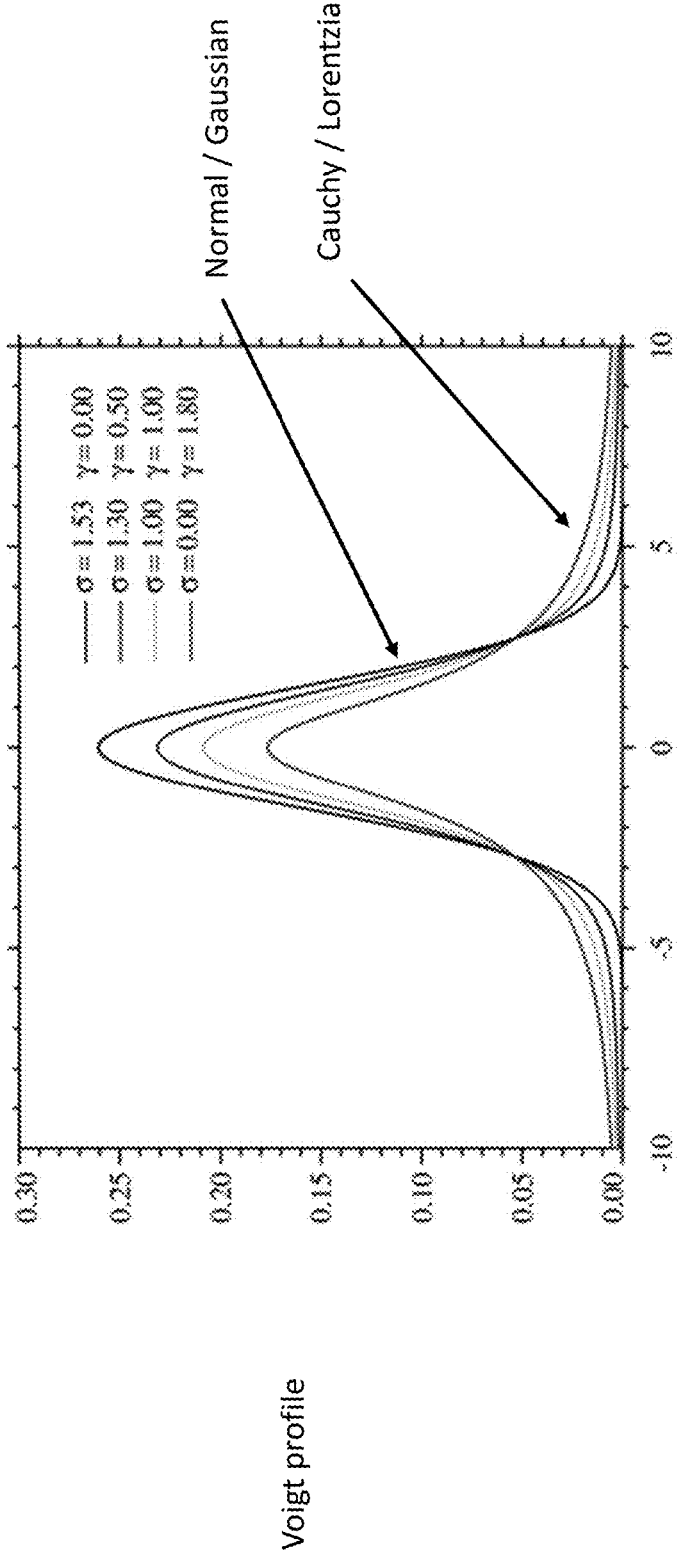

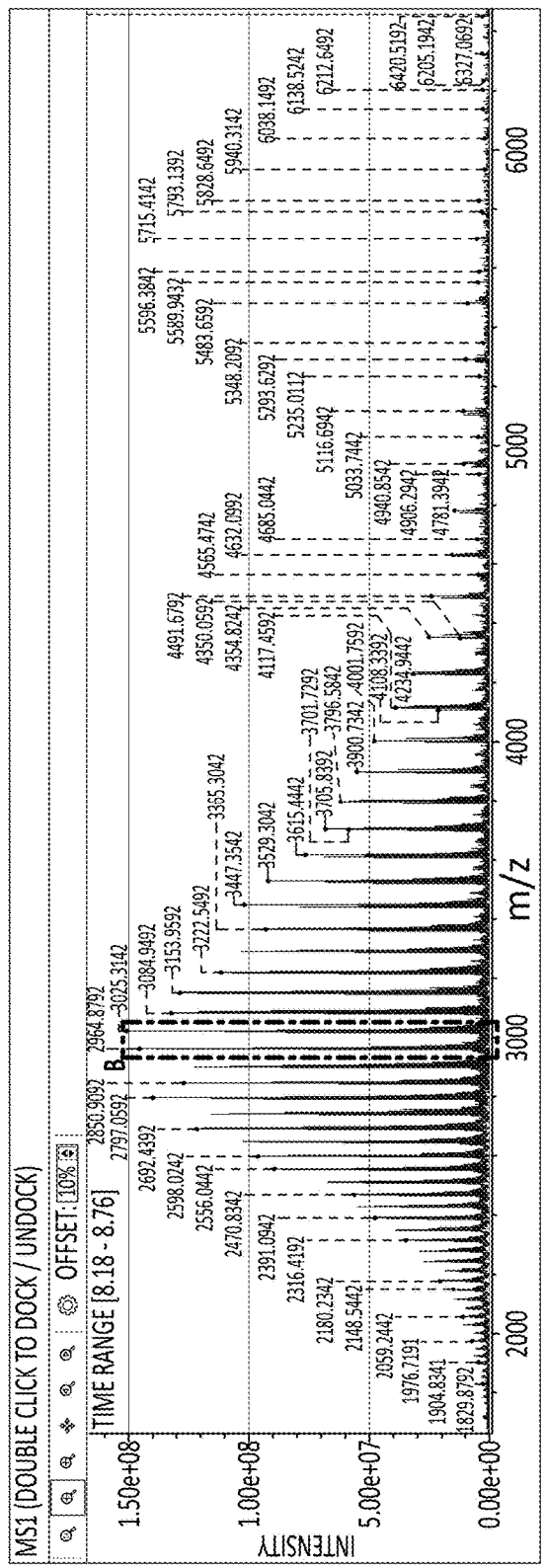
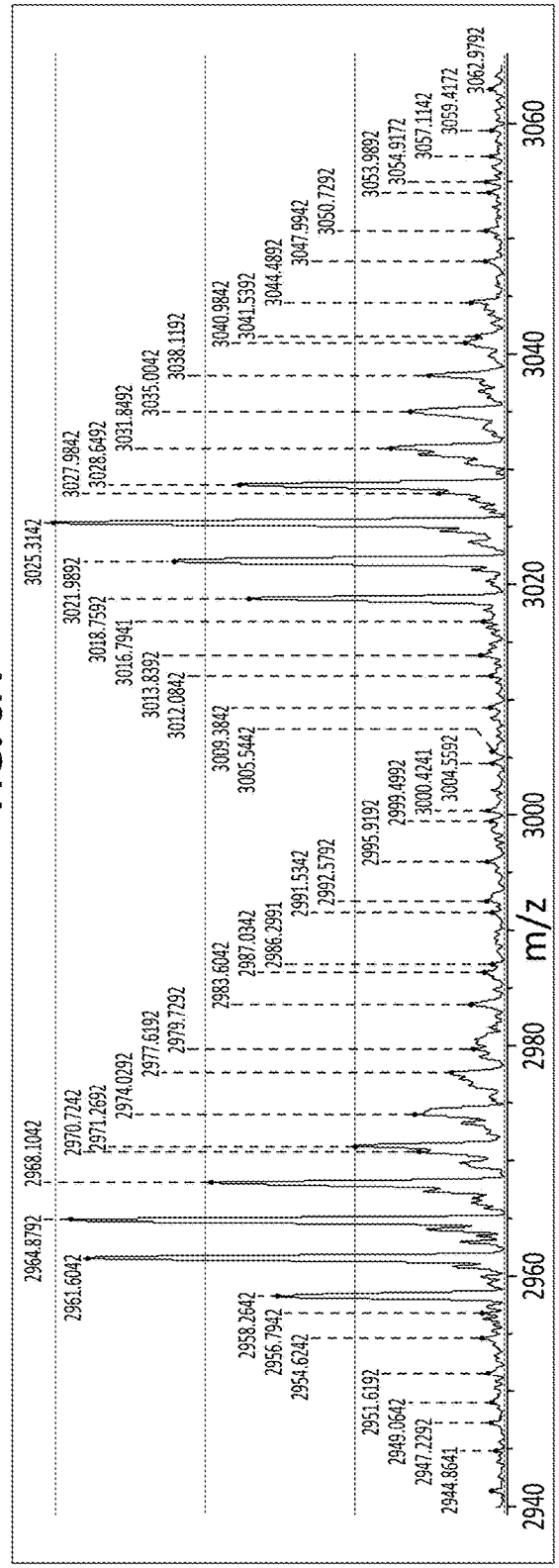
FIG. 6A
FIG. 6B

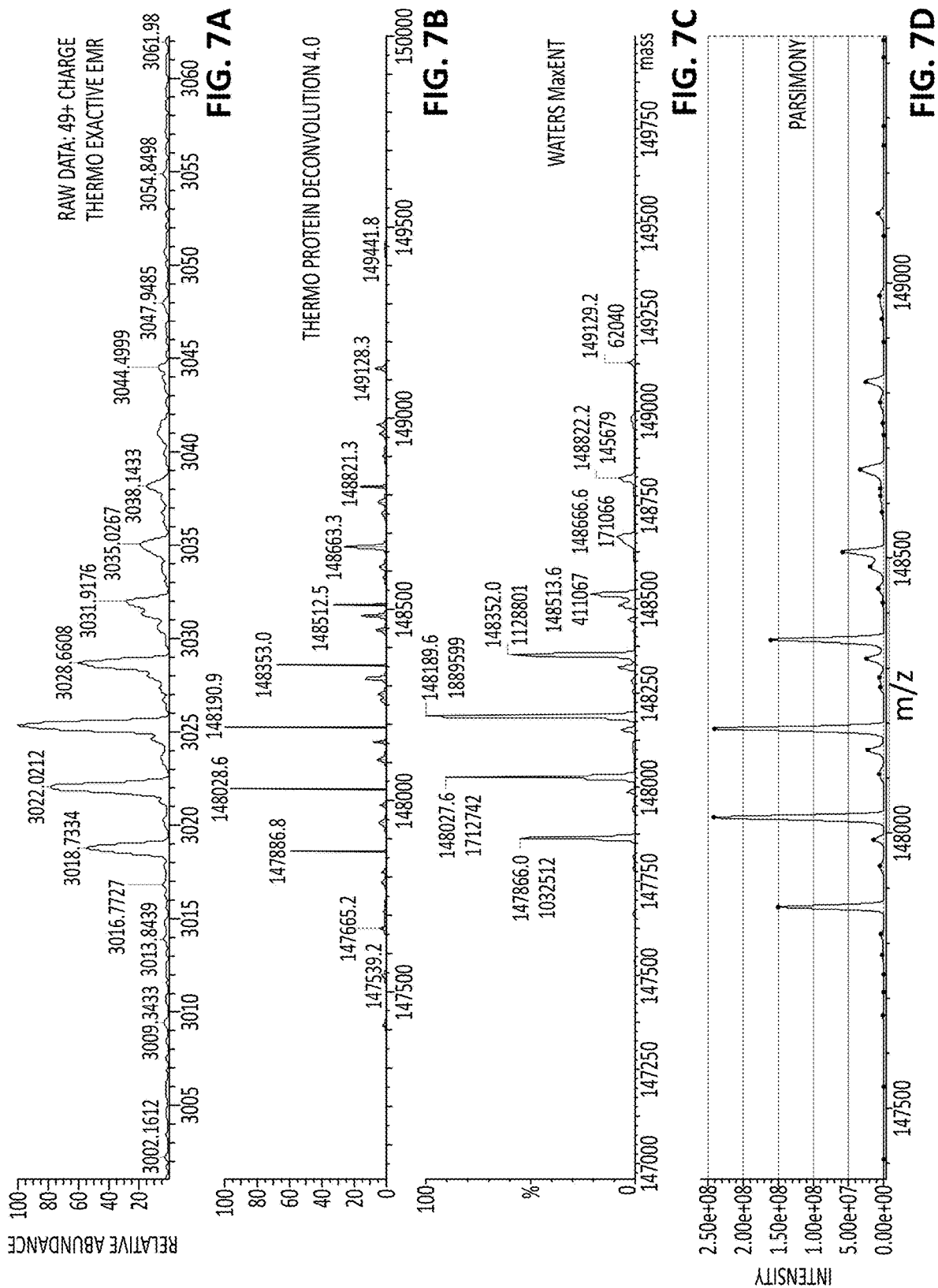

| Proteoform | Theoretical Mass | Thermo | Waters | Parsimony |
|---|---|---|---|---|
| G0F / G1F | 148,028.9 | 148,028.6 | 148,027.6 | 148,028.2 |
| G1F / G1F | 148,191.0 | 148,190.9 | 148,189.6 | 148,190.4 |
| G1F / G2F | 148,353.1 | 148,353.0 | 148,352.0 | 148,352.2 |
| G0F / G0F | 147,866.7 | 147,866.8 | 147,866.0 | 147,865.8 |
| G2F / G2F | 148,515.3 | 148,513.6 | 147,513.6 | 148,513.8 |
| G1F / G2F + NeuGc | 148,660.4 | 148,663.3 | 148,666.6 | 148,661.8 |
| G2F / G2F + NeuGc | 148,822.6 | 148,821.3 | 148,822.2 | 148,821.6 |
| G1F / G1F + Lys | 148,319.2 | 148,318.4 | 148,319.1 | 148,316.8 |
| G0F / G1F + Lys | 148,157.0 | 148,151.7 | 148,153.6 | 148,150.8 |
| G1F / G2F + Lys | 148,481.3 | 148,483.6 | 148,484.5 | 148,484.0 |
| G1F / G1F – GlcNAc | 147,987.8 | 147,985.4 | 147,989.8 | 147,988.4 |
| G1F / G1F + 2 Lys | 148,447.3 | 148,445.0 | 148,446.3 | 148,444.4 |
| G2F + NeuGc / G2F + NeuGc | 149,129.8 | 149,128.3 | 149,129.2 | 149,127.0 |
| G0F / G1F + 2 Lys | 148,285.2 | 148,278.8 | 148,283.7 | 148,282.4 |

FIG. 8

METHODS AND APPARATUSES FOR DETERMINING THE INTACT MASS OF LARGE MOLECULES FROM MASS SPECTROGRAPHIC DATA

CROSS REFERENCE TO RELATED APPLICATIONS

This patent application is a continuation of U.S. patent application Ser. No. 15/881,698, filed Jan. 26, 2018, titled "METHODS AND APPARATUSES FOR DETERMINING THE INTACT MASS OF LARGE MOLECULES FROM MASS SPECTROGRAPHIC DATA," now U.S. Pat. No. 10,319,573, which claims priority to U.S. Provisional Patent Application No. 62/451,040, filed on Jan. 26, 2017, and titled "METHODS AND APPARATUSES FOR DETERMINING THE INTACT MASS OF LARGE MOLECULES FROM MASS SPECTROGRAPHIC DATA," each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The invention is in the field of mass spectrometry and more specifically in the field of the analysis and interpretation of data produced by a mass spectrometer.

BACKGROUND

Mass spectrometry is an analytical tool that can be used to determine the molecular weights of chemical compounds by generating ions from the chemical compounds, and separating these ions according to their mass-to-charge ration (m/z). The ions are generated by inducing either a loss or a gain of a charge by the chemical compounds, such as via electron ejection, protonation, or deprotonation. The ions are then separated according to their m/z values and detected. The resulting data are often presented as a spectrum, a two-dimensional (2-D) plot with m/z ratio on the x-axis and abundance of ions on the y-axis. Thus, this spectrum shows the distribution of m/z values in the population of ions being analyzed. This distribution is characteristic for a given compound. Therefore, if the sample is a pure compound or contains only a few compounds, mass spectrometry can reveal the identity of the compound(s) in the sample.

Electrospray ionization mass spectra of biological macromolecules and protein complexes contain series of ion signals corresponding to the same chemical species in a sequence of charge states. The masses and intensities (ion currents) of the analyzed chemical species, as represented by an entire neutral-mass spectrum, can be inferred from the mass over charge measurements by computational deconvolution.

A complex sample usually contains too many chemical compounds to be analyzed meaningfully by mass spectrometry alone, because ionization of different chemical compounds may result in ions with the same m/z value. The more chemical compounds a sample contains, the more likely ions of the same m/z values will be generated from different compounds. Therefore, a complex sample is typically resolved to some extent prior to mass spectrometry, such as by liquid chromatography, gas chromatography, or capillary electrophoresis. In this sample separation step, the chemical compounds in the sample are separated based on how long they stay in the sample separation medium. Once a chemical compound goes through the sample separation medium, it enters a mass spectrometer system, and the ionization/ion separation/detection process begins as described above. The resulting data for each ion thus has one more property, retention time, which is the time the chemical compound that gives rise to the ion stays in the sample separation medium. Thus, mass spectral data of a sample that is analyzed by a sample separation method before mass spectrometry can be presented as a three-dimensional (3-D) plot, with retention time, m/z value and ion abundance on the three axes of the plot.

Even with a sample separation method, it is still not an easy task to analyze mass spectral data from a complex sample due to the vast number of peaks.

All charge deconvolution algorithms in use today are iterative algorithms that converge to a deconvolved neutral mass spectrum along with charge distributions for the neutral masses that together explain the observed m/z (mass over charge) spectrum. The most widely used deconvolution algorithm, with implementations called MaxEnt and ReSpect, was developed about 25 years ago and licensed to most of the mass spectrometry (MS) instrument manufacturers. This algorithm converges to a deconvolved neutral mass spectrum that optimizes an objective function that measures the quality of the result using criteria such as fit to the observed data, peak width, correlation between neighbouring charge states, and—its defining characteristic—the Shannon entropy of the neutral-mass spectrum. A more recent algorithm, UniDec, leaves out the entropy term, and builds in expected correlation between neighboring charge states by blending them with a smoothing filter. UniDec also includes specific support for ion mobility data and nanodisk analysis. Other recent work has focused on peak enhancement of m/z spectra in order to improve the performance of maximum entropy charge deconvolution for native mass spectrometry.

Methods to deconvolute mass spectral data based on compound properties such as isotopic clusters (see, e.g., U.S. 2007/0176088) have been proposed. In one method, 3-D peaks that share the same retention time are examined, and isotopic clusters of the same compound are grouped together, thereby reducing the complexity of the mass spectral data significantly. This method, however, is most useful for analytes with relatively small molecular weights. Large molecules, such as most intact proteins, are often too large for their isotopomers to be resolved in a mass spectrometer. As a result, an accurate monoisotopic mass cannot be calculated for the given isotopic cluster using the charge state spacing of the isotopomers.

Deconvolution methods transform an m/z (mass divided by charge) spectrum to a neutral mass spectrum by deducing the charges of the ions in the m/z spectrum, and then multiplying m/z values by the appropriate values of z (charge) and subtracting the masses of the charge carriers (typically protons) to determine neutral mass. Charge is deduced by relationships among peaks in the m/z spectrum, relying on the fact that an ion with charge 50+ is also likely to be observed with charges 48+, 49+, 51+, 52+, etc. Two types of artifacts are commonly observed: "harmonic" artifacts (akin to harmonics in acoustic signals) in which charge 50+ might be mistaken for 25+, 52+ mistaken for 26+, and so forth, and "off-by-one" artifacts in which charge 50+ is mistaken for 49+ or 51+. A neutral mass spectrum with harmonic and off-by-one artifacts may actually fit the observed m/z spectrum better than one without artifacts, because the artifacts have many more degrees of freedom to explain small shape and intensity variations in the observed m/z peaks. Current charge deconvolution algorithms based on "maximum entropy" all give some level of artifact, because the algorithms do not have special steps to bias against artifacts, and indeed entropy is larger for a mass spectrum with artifacts.

Despite these problems the most common method for intact protein mass determination is the maximum entropy deconvolution method. As mentioned, MaxEnt biases output towards smoother (higher entropy) mass spectrum, which may reduce background noise and resolves closely spaced masses, however it may also suppress small signals and retain "harmonic" artifacts. Furthermore, even with relatively narrow target mass ranges, off-by-one charge assignments produce another type of artifact, side lobes on either side of the true masses, for example 3000 Daltons (Da) too low and high if the strongest m/z signal is around m/z 3000. Both harmonic and off-by-one artifacts increase entropy of the deconvolution, so the entropy term in the objective function, which helps the algorithm resolve closely spaced masses, has the undesired side effect of promoting artifacts. Artifacts are a minor problem in some scenarios, but they can be quite misleading in other practical applications: (1) automated workflows that forego expert human inspection; (2) analysis of antibodies, including bispecifics, where harmonic artifacts may be mistaken for half-mAbs, aggregations, or mispairings; (3) antibody-drug conjugates (ADCs), where off-by-one artifacts may bias quantitation of drug loading; and (4) heavily glycosylated or other highly modified proteins.

Regardless of the algorithmic details, the deconvolution iteration generally converges to a local rather than a global optimum. Two important user-controlled parameters for deconvolution are the input m/z range and the output mass range. Deconvolution algorithms usually assume that all the ions (except perhaps some low-charge m/z peaks, recognizable by resolved isotopes) in the input range represent chemical species in the mass range. This assumption allows deconvolution of lower signal-to-noise spectra by limiting the number of masses and charges that the algorithm must consider, but it runs the risk that chemical species outside the mass range may be undetected or give false additional masses within the user-set target mass range. A practical solution entails deconvolution of the m/z range onto a wide mass range to survey the masses, followed by deconvolution of selected m/z ranges onto narrow mass ranges to capture more detailed information.

It is desirable to have a better method for deconvoluting complex mass spectral data from samples comprising large molecules. Thus, it would be beneficial to provide methods and apparatuses that address the problems described above.

SUMMARY OF THE DISCLOSURE

The present invention relates to methods an apparatuses (including devices, systems, and software, hardware and/or firmware) for determining the intact mass of large molecules from mass spectrographic data, including methods and apparatuses for transform an m/z (e.g., deconvolving an m/z) spectrum to a neutral mass spectrum by applying parsimony when estimating the charge vector and/or when determining the mass spectrum.

Algorithms for charge deconvolution of mass spectroscopy data start by assuming that m/z measurements or "bins" have unknown charge, say equal probability to have any charge from 1 to 100. They compute a deconvolved or neutral mass spectrum based on this assumption. They then change the charge probabilities based on the neutral mass spectrum, and compute a new neutral mass spectrum, and iterate this process for a number of rounds. The deconvolved mass spectrum is implied by the observed m/z spectrum and the charge probabilities for each m/z bin, and conversely the deconvolved mass spectrum and charge probabilities for each m bin imply a "theoretical" m/z spectrum that is close to the observed data. Present algorithms and software iterate to optimize an objective function that measures the goodness of fit of the theoretical and observed m/z spectra, along with optional terms that we shall call "plausibility measures". The commonly used plausibility measure is "maximum entropy," that is, a mass spectrum with high Shannon entropy (a measure of randomness) is preferred over one with low Shannon entropy. Here we propose "parsimony" as a new plausibility measure. We define "parsimony" to be any measure of the simplicity of the deconvolved mass spectrum, including but not limited to one or more of: (1) fewer intense peaks in the mass spectrum; (2) fewer "harmonic" relationships, that is, masses in small integer ratios (e.g., 1:2, 1:3), or in the m/z spectrum, fewer m/z bins with high probability for charges in small integer ratios; and (3) fewer "off-by-one" relationships, that is, m/z bins with high probability for two adjacent charges.

Thus, described herein are methods of determining intact mass (e.g., generating a neutral mass spectrum) by applying mathematical parsimony measures in the objective function to be optimized by the iteration. Any of these methods may also include iteration steps that increase parsimony without the use of an explicit objective function. Finally, these methods may include biased statistical methods that bias against harmonic and off-by-one relationships in any or all rounds of an iterative algorithm for charge deconvolution.

Charge deconvolution infers the mass from mass over charge (m/z) measurements in electrospray ionization mass spectra. When applied over a wide input m/z or broad target mass range, charge-deconvolution algorithms can produce artifacts, such as false masses at one-half or one-third of the correct mass. Indeed, a maximum entropy term in the objective function of MaxEnt, the most commonly used charge deconvolution algorithm, favors a deconvolved spectrum with many peaks over one with fewer peaks. The "parsimonious" charge deconvolution methods described herein may produce fewer artifacts. These methods and apparatuses (including software) described herein are especially well-suited to high-resolution native mass spectrometry of intact glycoproteins and protein complexes. Deconvolution of native mass spectra poses special challenges due to salt and small molecule adducts, multimers, wide mass ranges, and fewer and lower charge states. We demonstrate the performance of the new deconvolution method on a range of samples. On the heavily glycosylated plasma properdin glycoprotein, these methods could deconvolve monomer and dimer simultaneously, and when focused on the m/z range of the monomer, gave accurate and interpretable masses for glycoforms that had previously been analyzed manually using m/z peaks rather than deconvolved masses. On therapeutic antibodies, these methods facilitated the analysis of extensions, truncations, and Fab glycosylation. The methods and apparatuses described herein also facilitate the use of native mass spectrometry for the qualitative and quantitative analysis of protein and protein assemblies.

To address these issues, described herein are improved charge deconvolution methods that may divide the process into two stages: charge inference and peak sharpening. The charge inference stage aims for an artifact-free neutral mass spectrum with a "parsimonious" set of mass peaks that explains the observed m/z spectrum. The optional peak sharpening stage uses point-spread-function deconvolution on the neutral mass spectrum to resolve closely spaced peaks. Post-deconvolution peak sharpening on the neutral mass spectrum has practical advantages over coupled charge inference and peak sharpening, including speed of processing, visual inspection of before and after spectra, and compatibility with a variety of well-developed super-resolution algorithms, such as Richardson-Lucy, maximum entropy, and convolutional neural networks. This design choice imposes some restrictions on the super-resolution algorithm's underlying physical model; for example, the point-spread function may depend upon mass, for example, broadening at higher mass, but not upon charge or m/z.

The methods described herein may include just the charge inference stage, because charge inference is central and unique to ESI mass spectrometry, and may also the source of the most misleading deconvolution artifacts, meaning false masses far removed from all true masses. (The super-resolution stage can produce minor artifacts such as "ringing" around true masses.) We demonstrate parsimonious charge inference on complex glycosylated therapeutic antibodies and a heavily glycosylated plasma glycoprotein, all analyzed under native conditions. We reveal on several therapeutic antibodies a variety of interesting causes of species micro-heterogeneity, including N-terminal extensions and truncations, abundant C-terminal lysine retention, and multiple glycosylation sites. This improved parsimonious charge deconvolution tool may benefit the qualitative and quantitative analysis of protein therapeutics, including biosimilar testing, drug load quantification in ADCs, and glycoproteoform analysis.

For example, described herein are methods of identifying or characterizing at least one property of a sample, such as the intact mass of the sample, the method comprising the steps of: receiving a measured mass over charge (m/z) spectrum for the sample; setting charge assignments for a number of bins of the measured m/z spectrum based on a deconvolution of the measured m/z spectrum; applying parsimony weighting to adjust the charge assignments to a reduced number of charges; generating an intermediate neutral mass spectrum using the adjusted charge assignments; iterating the steps of applying parsimony weighting and generating the intermediate neutral mass spectrum to determine a parsimonious neutral mass spectrum after the intermediate neutral mass spectrum either converges or after a predetermined number of iterations; and using the parsimonious neutral mass spectrum to identify or characterize at least one property of the sample.

Applying parsimony weighting may include re-weighting the charge assignments to reduce the number of different charges. For example, assuming that m/z spectrum bins are more likely to represent a mix of ions with only a few different charges than a mix with many different charges, applying parsimony generally entails weighting or re-weighting charge assignments for m/z spectrum bins to reduce the estimated number of different charges.

Applying parsimony weighting may further comprise estimating a minimum expected number of molecules.

In general, the parsimony weighting may be based on one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum. For example, applying parsimony weighting may include identifying a number of harmonic relationships in the deconvolution of the measured m/z spectrum and assigning a minimum number of molecules to achieve the identified number of harmonic relationships. In some variations, applying parsimony weighting may include identifying a number of off-by-one relationships in the deconvolution of the m/z spectrum and selecting charge assignments to adjust based on the identified off-by-one relationships.

Generating the intermediate neutral mass spectrum may comprise multiplying m/z values from the spectrum by the charges and subtracting masses of charge carriers to determine a neutral mass. Generating the intermediate neutral mass spectrum may include deconvoluting the measured m/z spectrum using the reduced number of charges.

The measured m/z spectrum may be provide from any appropriate source, and may in particular comprise electrospray mass spectral data. In any of these methods, the step of taking the measured m/z spectrum may be included. Similarly any of the apparatuses descried herein may be configured as (or may include) a device for taking mass spectral data (e.g., electrospray mass spectral data).

In general, the methods described herein may be used to determine qualitative (e.g., structure) and/or quantitative (e.g., molecular mass or concentration) information on analyte molecules in the measured m/z spectrum. For example, the methods described herein for using the parsimonious neutral mass spectrum to identify or characterize at least one property of the sample may be used to determine, for example, the intact mass of large molecules in the sample. Alternatively or additionally, the methods may be used to determine relationships (e.g., dimers, trimers, etc.) between molecules in the sample. The at least one property of the sample may include determining or identifying that the sample includes reduced and intact monoclonal antibodies, Ides-digested and intact bispecific antibodies, antibody-drug conjugates, DNA oligos, heavily glycosylated glycoproteins, protein-ligand binding, and non-covalently bound protein complexes up to 1 MDa or more, etc.

For example, a method of identifying or characterizing at least one property of a sample may include: receiving a measured mass over charge (m/z) spectrum for a sample; setting charge assignments for a number of bins of the measured m/z spectrum based on a deconvolution of the measured m/z spectrum; applying parsimony weighting to adjust the charge assignments to a reduced number of charges and to reduce an expected number of molecules from the measured m/z spectrum, wherein the parsimony weighting is based on one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum; generating an intermediate neutral mass spectrum using the adjusted charge assignments; iterating the steps of applying parsimony weighting and generating the intermediate neutral mass spectrum to determine a parsimonious neutral mass spectrum after the intermediate neutral mass spectrum either converges or after a predetermined number of iterations; and using the parsimonious neutral mass spectrum to identify or characterize at least one property of the sample.

Also described herein are apparatuses that may perform any of the methods described herein. As mentioned, these apparatuses may be part of or may include a mass spectrometer. Alternatively or additionally, these apparatuses may be configured as software, firmware and/or hardware, including non-transitory computer-readable storage medium storing a set of instructions capable of being executed by a processor. The processor may be part of the apparatus or may be used with the apparatus. For example, described herein are non-transitory computer-readable storage medium storing a set of instructions capable of being executed by a processor, that when executed by the processor causes the processor to: receive a measured mass over charge (m/z) spectrum for the sample; set charge assignments for a number of bins of the measured m/z spectrum based on a deconvolution of the measured m/z spectrum; apply parsimony weighting to adjust the charge assignments to a reduced number of charges; generate an intermediate neutral mass spectrum using the adjusted charge assignments; iterate the application of parsimony weighting and generation of the intermediate neutral mass spectrum to determine a parsimonious neutral mass spectrum after the intermediate neutral mass spectrum either converges or after a predetermined number of iterations; and use the parsimonious neutral mass spectrum to identify or characterize at least one property of the sample.

The set of instructions may cause the processor to re-weight the estimated charge states to reduce the estimated number of different charges when applying parsimony weighting, and/or may cause the processor to estimate a minimum expected number of molecules when applying parsimony weighting.

The set of instructions may cause the processor to apply parsimony weighting based on identifying one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum. For example, the set of instructions cause the processor to identify a number of harmonic relationships in the deconvolution of the measured m/z spectrum and assign a minimum number of molecules to achieve the identified number of harmonic relationships when applying parsimony weighting. Alternatively or additionally, the set of instructions may cause the processor to identify a number of off-by-one relationships in the deconvolution of the m/z spectrum and select estimated charge states based on the identified off-by-one relationships when applying parsimony weighting.

The set of instructions may cause the processor to multiply m/z values from the spectrum by the estimated charges and subtract masses of the charge carriers to determine a neutral mass when generating the intermediate neutral mass spectrum, and/or may cause the processor to deconvolute the measured mass over charge (m/z) spectrum using the reduced number of estimated charge states when generating the intermediate neutral mass spectrum.

In any of these variations, the set of instructions may cause the processor to determine one or more properties, including structural properties and/or quantitative properties. For example, set of instructions may cause the processor to determine the intact mass of large molecules in the sample when using the parsimonious neutral mass spectrum to identify or characterize at least one property of the sample.

In any of the methods and apparatuses described herein, the property of a sample identified may be output (e.g., displayed, transmitted, etc.) and/or stored. For example the property may be displayed as part of a report that is or includes the parsimonious neutral mass spectrum. The parsimonious neutral mass spectrum may be annotated to include the one or more properties (estimated charge values, etc.).

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 4A illustrates a method for deblurring/sharpening using a Richardson-Lucy deblurring algorithm for sharpening a mass spectra, including assuming a particular (e.g., Voight) point spread function, blurring an initial guess of a 'sharp' spectrum with the assumed point spread function, and iteratively improving the sharp guess by blurring and comparing the result to the measured spectrum; FIG. 4B illustrates various point spread functions that may be used with this method (Voigt profiles), including Normal (Gaussian) point spread function/distribution and Cauchy (Lorentzian) point spread function/distribution. The apparatus described herein may allow a user to select application of either point spread function, as shown in FIGS. 5B and 5C.

FIG. 6A shows an example of a mass spectrum for a glycosylated antibody (taken by Thermo Exactive EMR). FIG. 6B shows a magnified view of a portion (boxed region B) of the spectrum shown in FIG. 6A.

FIGS. 7A-7D show a comparison of different deconvolution methods; FIG. 7A is the raw data, FIG. 7B is deconvolved using the "Thermo Protein Deconvolution 4.0" software (based on a MaxENT method), FIG. 7C is uses the "Waters MaxENT" method, and FIG. 7D uses the parsimony method described herein.

FIG. 8 is a table showing the mass accuracy for the most high-intensity peaks in a spectrum that has been deconvolved by the same methods shown in FIGS. 7B-7D, compared with theoretical values for an exemplary (glycosylated) protein.

FIG. 12A shows a zoomed-in view of the 3800-4000 m/z range of properdin monomer mass spectrum.

FIG. 12B shows a zoomed-in view of PMI Intact's deconvolution computed on m/z range 3000-6500 and m range 10,000-160,000.

In FIG. 13A, the m/z spectrum shows three distinct charge series. In the mass spectrum shown in FIG. 13B, the peak at 143,831 Da represents the mass of the full mAb without glycans or C-terminal Lys. 11,057 Da and 132,792 Da (which sum to 143,849) reveal the occurrence of two fragments formed via a GG clip from the heavy chain N-terminus. 143,831 is accompanied by two smaller peaks at a ☐Mw of +340 and +680 Da. The fragments of 132,792 Da and 11,057 Da each have only one +340 peak. These molecules originate from N-terminal extensions of the amino acid residues VHS (part of the signal peptide). FIG. 13C shows an isotope-resolved deconvolved mass spectrum. The small peak at 11,161.451 (≈11,057.410+87.032+17.027) fits the GG clip along with N-terminal S, which prevents the formation of a pyro-Glu at the most abundant N-terminal Q. Thus, three distinct N-termini co-exist in this mAb product; the most abundant is pyroQVQLV . . . , the less abundant VHSQVQLV . . . , and least abundant SQVQLV . . . .

In FIG. 14A, deglycosylated Infliximab shows three abundant species with masses in agreement with the amino acid sequence of the full mAb, along with species from which one or two C-terminal lysines had been clipped. The small peaks at 146,042 and 146,837 Da most likely represent, respectively, glycation on 146,042 and ManS on 145,623. In the deconvolved mass spectrum of the glycosylated infliximab shown in FIG. 14B, the marked peaks exhibit the same triplets originating from the mAb with zero, one, or two C-terminal lysines, along with two N-glycans with G0F (=HexNAc(4)Hex(3)Fuc(1)). Each marked peak begins a chain of peaks with approximate 162 Da spacing, showing glycosylation heterogeneity. For example, the peaks at masses 148511, 148673, 148838, 149091, 149256, and 149416 Da, correspond to the mAb with no C-terminal lysine and zero to five Gal monosaccharides.

DETAILED DESCRIPTION

Figure 1A:
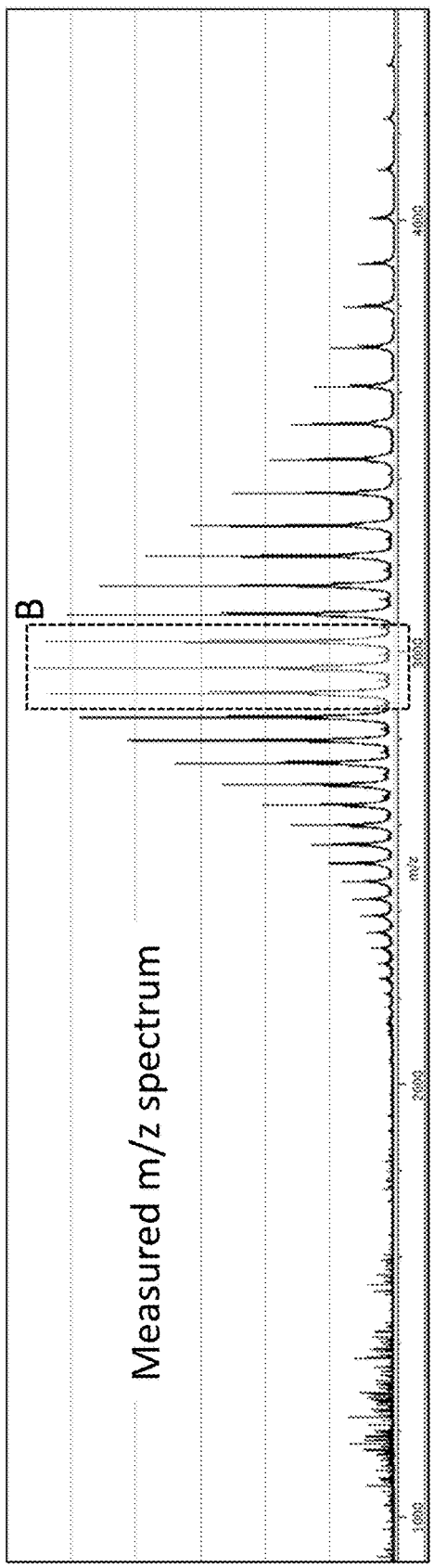
FIG. 1A is an example of a measure m/z spectrum of an intact monoclonal antibody (mAb).
Figure 1B:
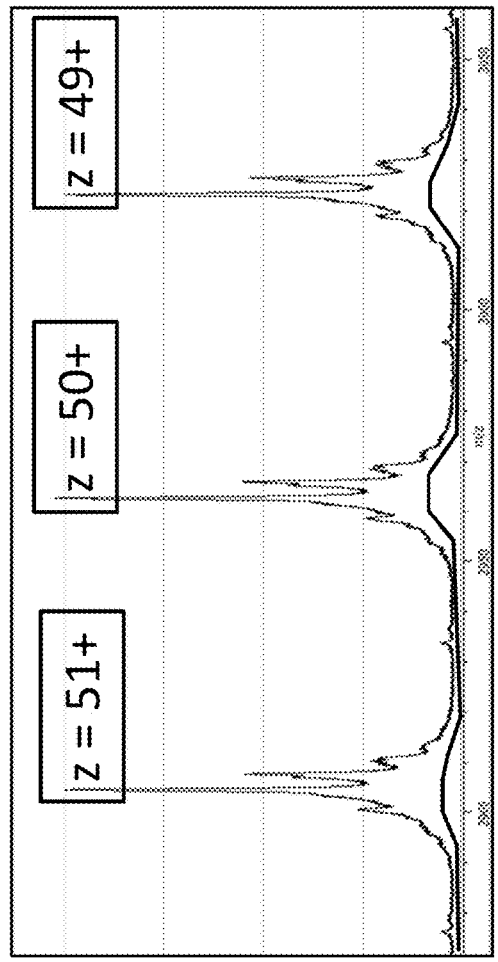
FIG. 1B shows an enlarged view of the three largest peaks of the spectrum of FIG. 1A (charges 51+, 50+ and 49+).
Figure 1C:
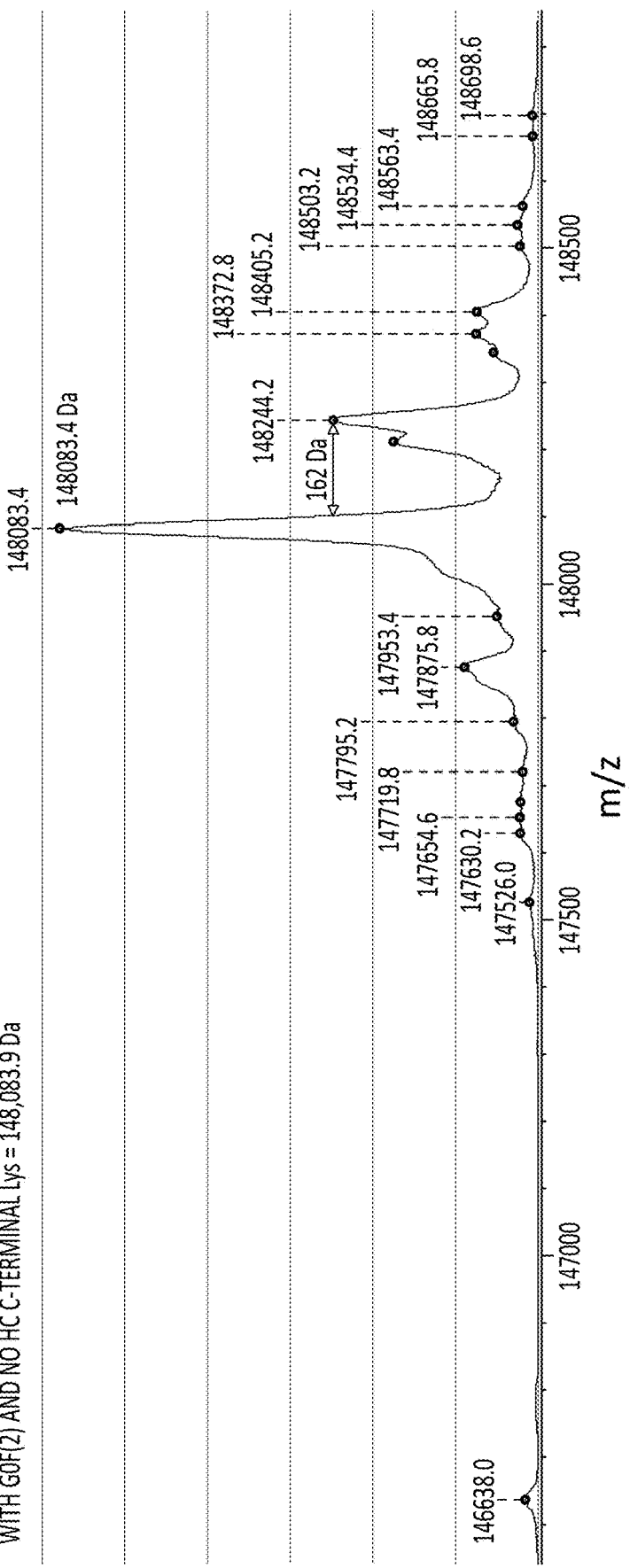
FIG. 1C shows the deconvolved mass spectrum (multiplied m/z by the z, and summing, also subtracting a baseline), showing good coordination with theoretical and measured results (e.g., 148,083 D).

In general, described herein are methods and apparatuses (including methods of estimating the intact mass of a large molecule from mass spectrographic data. In particular, described herein are methods of deconvolving raw mass/charge spectrum data by applying a parsimony weighting or bias and apparatuses for performing this method.

In any of the methods described herein, the charge state of a mass/charge spectrum may be estimated. For example, FIGS. 1A-3D illustrate one method of estimating charge state of a mass/charge (m/v) spectrum. Similarly, FIGS. 4A-5C illustrate one method of sharpening a mass spectrum using an iterative process (similar to Richardson-Lucy deblurring) by applying a Voight point spread function.

Any of the methods of deconvolving a mass spectrum may apply a method referred to herein as "parsimony" or "parsimony weighting" or "parsimony bias" when deconvolving a mass/charge spectrum to generate a mass spectrum. As discussed above, the majority of deconvolving mass spectrum methods previously known apply an iterative "maximum entropy" (MaxEnt) algorithm which measures the entropy and preferentially selects deconvolved spectrum with higher entropy and uses this to smooth the resulting spectrum. In contrast, described herein are methods that use a parsimonious algorithm, which instead selects, biases or weights mass spectrum (e.g., measures in the objective function to be optimized by the iteration) by iterating to find the one (or more) that fits the mass/charge data with the highest parsimony, which may be determined by biasing against harmonic and off-by-one relationships in any or all rounds of an iterative algorithm for charge deconvolution. The deblurring method described above may also be applied in conjunction or as part of the deconvolution method applying parsimony as described herein (e.g., using a Voigt point spread function).

In general, most deconvolution methods start by assuming that the m/z measurements ("bins") have an unknown charge, allotting equal probability to any charge (e.g., from 1 to 100), and then compute a deconvolved or neutral mass spectrum based on this "neutral assumption". Recall the discussion, above of deducing charge state for various peaks (see, e.g., FIGS. 1A-3D). The charge state may be estimated by iterating for a number of rounds (e.g., 3, 4, 5, etc.). A deconvolved mass spectrum may be implied by the observed m/z spectrum and the charge probabilities for each m/z bin; conversely, the deconvolved mass spectrum and charge probabilities for each m bin may imply a "theoretical" m/z spectrum that is close to the observed (experimental) data. Most methods for deconvolution of a mass spectrum iterate to optimize an objective function that measures how well (goodness of fit) the theoretical m/z spectrum fits the observed data, and applies a bias to determine this goodness. The bias applied is "maximum entropy", which typically favors (assigns a higher score to) those spectra that have a higher Shannon entropy (a measure of randomness). Thus, for each iteration, deconvolved spectra having a higher randomness are typically favored.

Figure 3A:
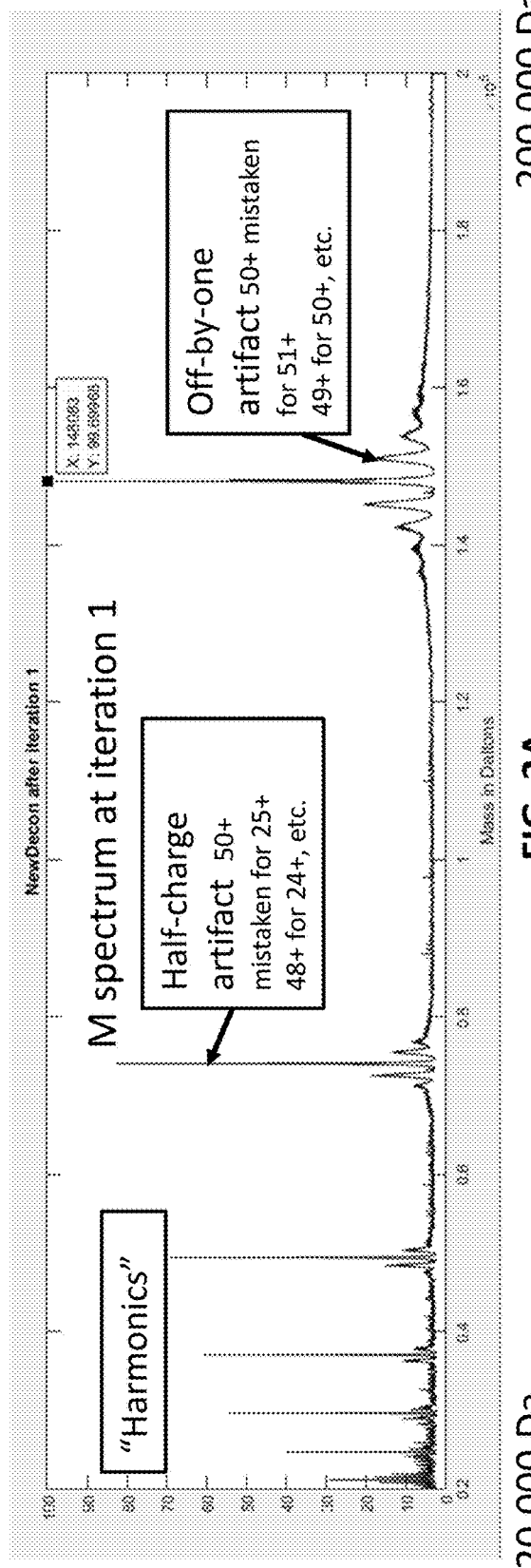
FIG. 3A shows an example of a mass spectra being analyzed to determine charge state as described in FIG. 2A, after the first iteration.
Figure 3B:
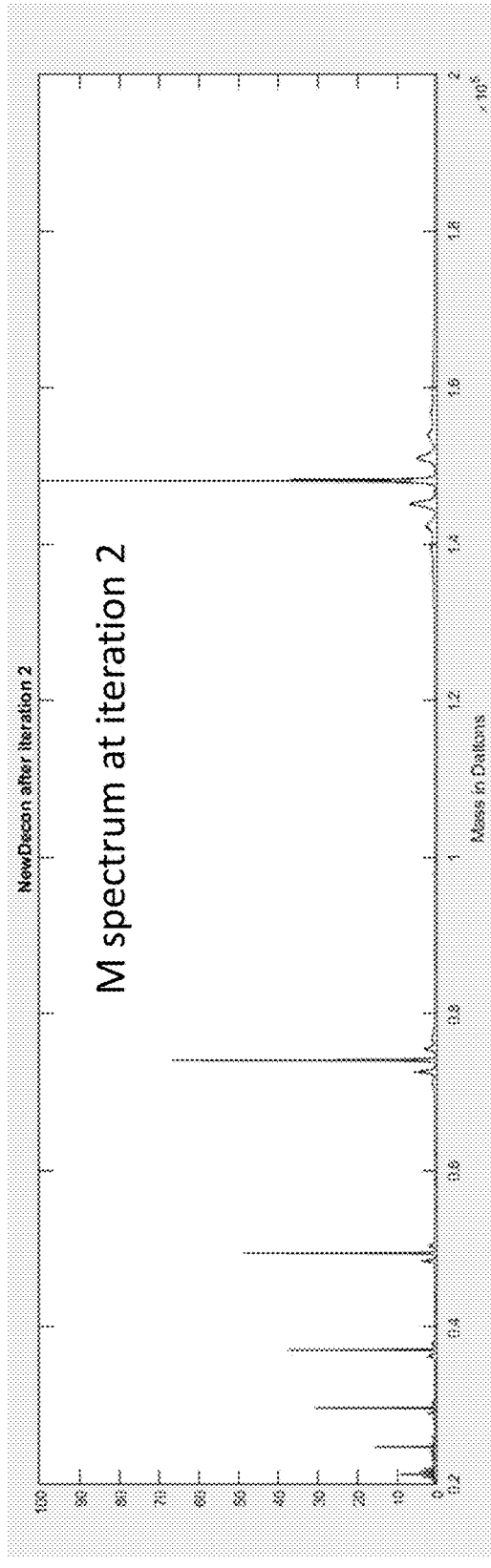
FIG. 3B shows an example of deducing the charge state of the mass spectra of FIG. 3A, after the second iteration.
Figure 3C:
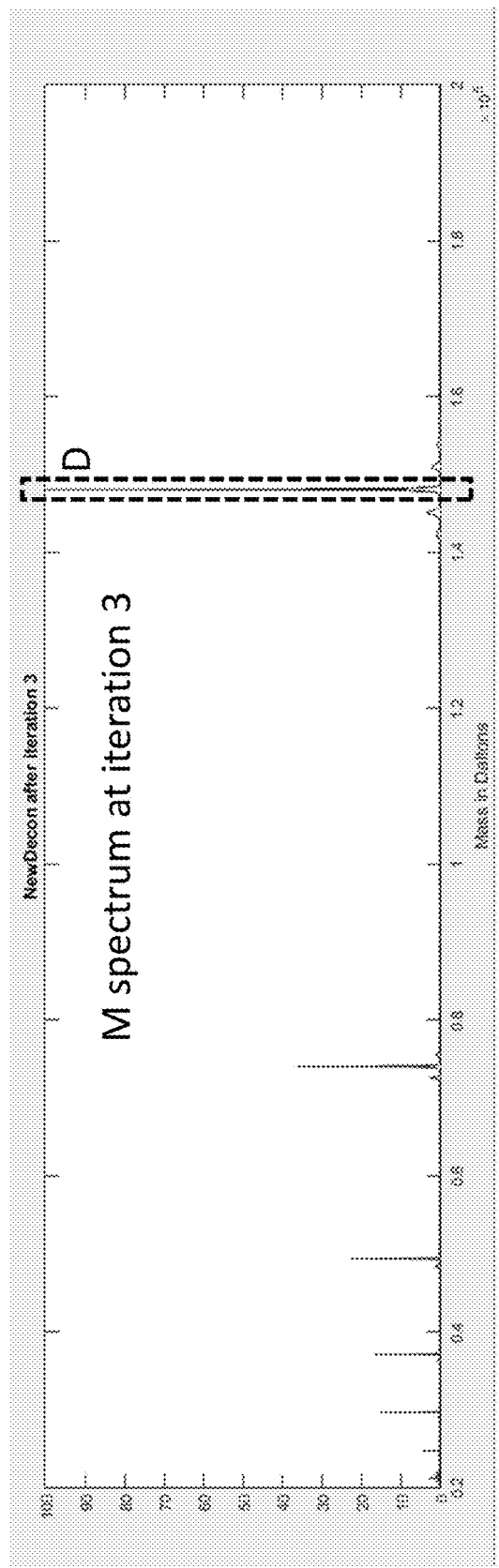
FIG. 3C shows an example of deducing the charge state of the mass spectra of FIG. 3A being sharpened after the third iteration.
Figure 3D:
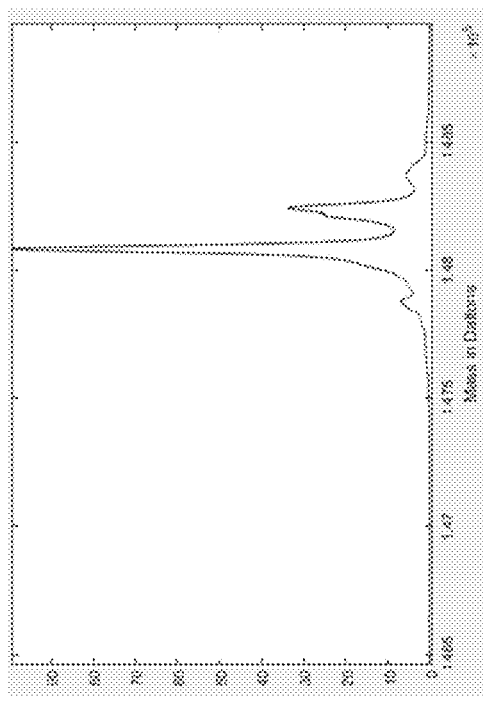
FIG. 3D shows an enlarged view of the boxed region (D) of FIG. 3C.
Figure 5A:
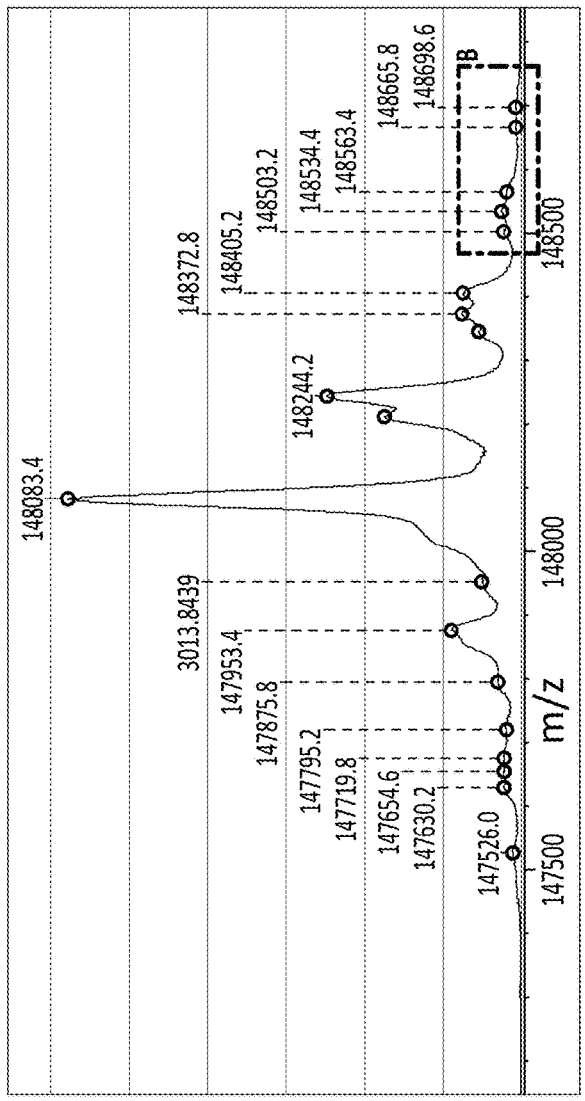
FIG. 5A is an example of a mass spectrum to be deblurred/sharpened.
Figure 5B:
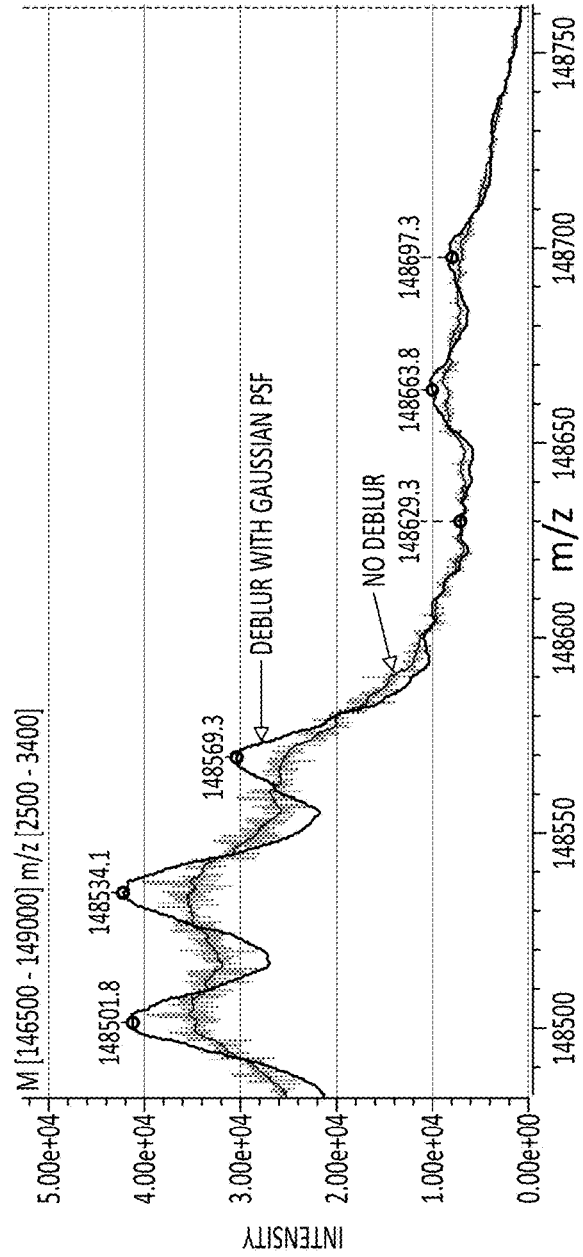
FIG. 5B is an example of sharpening the mass spectra of FIG. 5A by applying a Gaussian point spread function using a Richardson-Lucy deblurring algorithm (per the method outlined in FIG. 4) to the portion of the spectrum shown in box B of FIG. 5A.
Figure 5C:
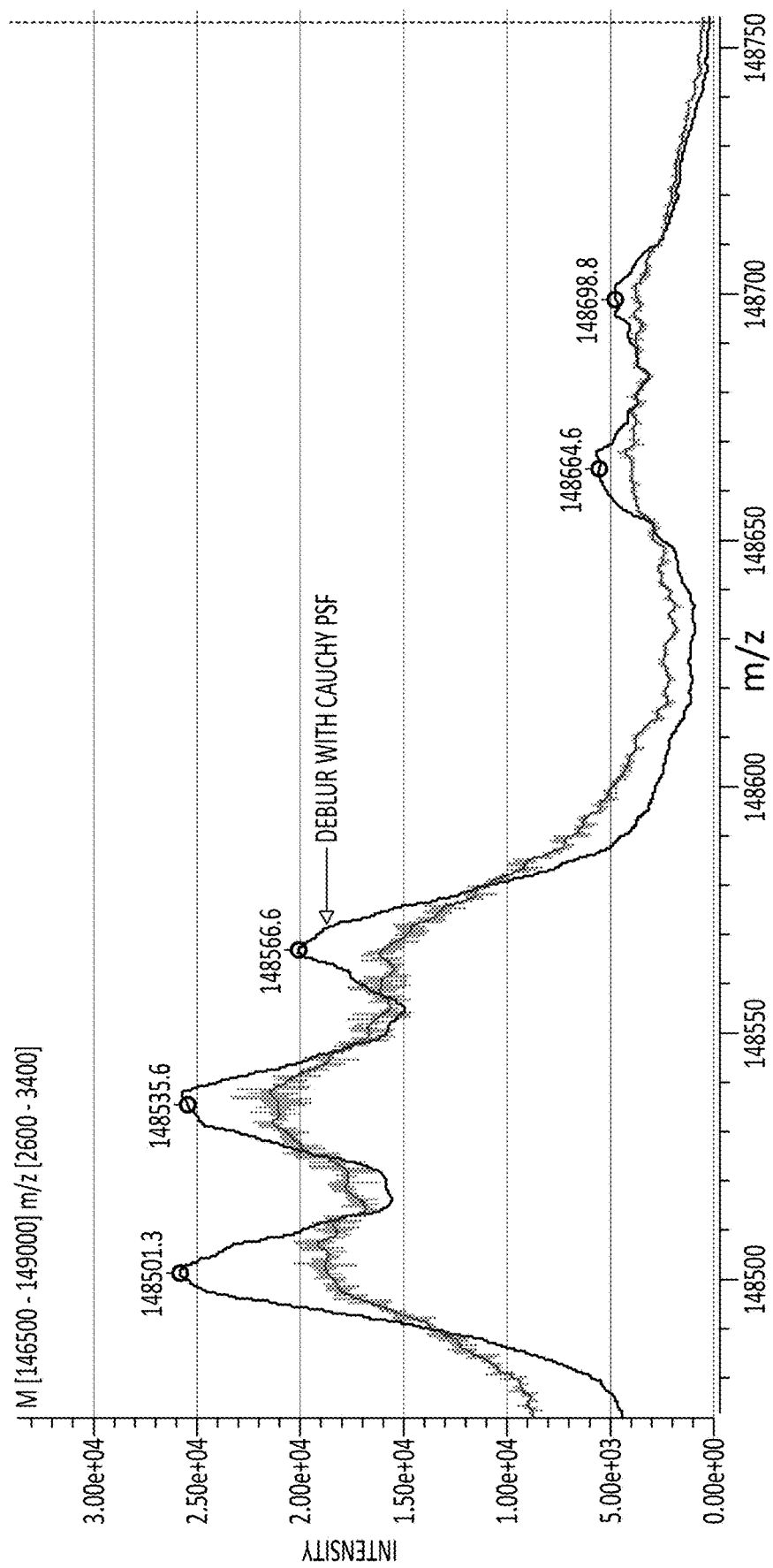
FIG. 5C is an example of sharpening the mass spectra of FIG. 5A by applying a Cauchy point spread function using a Richardson-Lucy deblurring algorithm (per the method outlined in FIG. 4) to the portion of the spectrum shown in box B of FIG. 5A.

In contrast, the methods described herein may instead weight or favor those spectra that have a higher parsimony, e.g., a measure of how "simple" the deconvolved mass spectrum is. The parsimony of the deconvolved mass spectrum may be determined by weighting those spectra that have fewer intense peaks in the mass spectrum. Alternatively or additionally, a higher parsimony score may be given to those deconvolved spectra that have fewer harmonic relationships. Recall that, as shown in FIG. 3A, harmonics includes half-charge (⅓ charge, ¼ charge, etc.) artifacts, which present peaks, e.g., at the ½, ⅓, etc. charge state. Spectra having fewer harmonics (or requiring fewer harmonics to explain) may be favored. A higher parsimony score may also be applied to those deconvolved spectra having fewer "off-by-one" relationships, in which the m/z bins have a high probability for two adjacent charges.

In general, regardless of whether a charge deconvolution algorithm favors entropy or parsimony or some other plausibility measure, the algorithm itself iteratively computes the neutral mass spectrum and the charging that would transform the neutral masses to an m/z spectrum close to the observed m/z spectrum. For example, an initial guess of the charges in the observed m/z spectrum might be that all charges from 1+ to 100+ are equally likely for all m/z bins, that is, for any given m/z bin 1% of the ions have charge 1, 1% have charge 2, and so forth. Multiplying m/z bins by this vector of charge assignments (and then subtracting the masses of the charge carriers) gives an initial neutral mass spectrum. Now a second guess of the charges in the observed m/z spectrum might be that charges in m/z bins are proportional to the intensity values in the neutral mass spectrum at the appropriate mass bins for charges 1+ to 100+. This second guess of charges can be used to give a new neutral mass spectrum, which in turn gives a third guess of charges. In this way, the iterative algorithm converges to a solution for the neutral mass spectrum. We will call this solution "unbiased" because it was computed with no considerations other than goodness of fit to the observed m/z spectrum.

This standard method for identifying a neutral mass spectrum may be modified by a procedure such as the well-known "maximum entropy" method discussed above, which is in widespread use. Maximum entropy biases the solution towards a neutral mass spectrum with higher Shannon entropy, roughly speaking, a solution most similar to a uniform probability distribution. This bias smooths out noisy background, but does not reduce harmonic and off-by-one artifacts, because artifacts increase rather than decrease entropy over an artifact-free solution.

The methods and apparatuses described herein may apply a parsimony bias, instead of the traditional maximum entropy (MaxENT) bias. Parsimony biases the solution towards a neutral mass spectrum that explains the observed m/z bins with fewer molecules in fewer charge states. One can build in a parsimony bias using, among other methods, an a priori probability on charge vectors for m/z bins. For example, a vector of charge assignments with high values for 6+, 12+, 18+, 24+, and 48+ could be considered unlikely relative to one with a high value for only 24+. One simple a priori probability would assume that an m/z bin contains one ion species with probability p<1.0, two ion species with probability $p^2$, three with probability $p^3$, and so forth. Bayes' rule could then be used to compute a charge vector incorporating both the current neutral mass spectrum and the a priori distribution. By making multiple charge assignments for a single m/z peak less likely, parsimony suppresses artifacts, yet retains low-abundance true molecules that have separate evidence in the form of unshared m/z peaks.

Thus, the general concept of parsimony when applied to estimating charge vectors and/or deconvolving to determine a mass spectrum may incorporate one or more techniques for reducing the complexity (e.g., number of peaks) of the spectrum. The number of peaks typically corresponds to distinct molecules in the spectrum. Although there it is widely understood that removing information (e.g., peaks) from a spectrum results in a loss of information, the methods and apparatuses described herein may in fact preserve critical information while removing non-critical information (and noise). This concept may be based on the fact that the types of errors present in spectra mentioned above, e.g., harmonics and off-by-one artifacts, appear in a pattern. The methods and apparatuses described herein may recognize (or at least "guess") at these patterns and may modify the charge vectors when applied iteratively in the general method for determining a neutral spectrum.

In a broad sense, these methods and apparatuses may be configured to recognize one or both types of patterns. For example, the methods described herein may include a step of recognizing or distinguishing off-by-one errors and reducing the weights (e.g., charge vectors) for such peaks.

For example, if a potential neutral spectrum results in a peak at 40,000 D, (where the predicted peak is at 20,000 D), this may be the result of a harmonic (doubling) of the mass. In general, the charge vectors and/or spectra may be analyzed to identify a harmonic series, in which there are peaks at one or more of: x, 2x, 0.5x, 0.25x, etc. (e.g., 2x, x, 0.5x, 0.3x, 0.25x, etc., or 2x, x, 0.5x, etc.). To get rid of a double mass artifact, the apparatuses or methods described herein may analyze the peaks to determine if the even charges could apply to double mass or half mass, odd can only be the half mass. A string of peaks may therefore be examined to determine patterns of harmonics, first by assigning only a single molecule, then by assuming two molecules, then three molecules, etc., with the bias that the lowest number of molecules (n molecules) which fits the data reasonably well, when determining that the majority of peaks are attributable to n molecules, may allow eliminating (e.g., weighting against when estimating charge vectors) harmonics of the n putative molecule is (e.g., tossing out the spurious peaks arising due to the harmonics). This may be, in some variations, implemented by looking at multiple (e.g., 3) peaks in a row. In this case, at least one peak must be an odd number, if you don't have all 3 it doesn't count; even and odd charges may be treated differently.

In some variations the methods (or an apparatus implementing them) may apply steps to recognize off-by-one peaks (e.g., applying an off-by-one rule). In this instance, the spectra may be examined to determine if (for the lowest number of n molecules) the spectra has peaks that conform to +1/−1 charge states; for example if an expected charge vector is charge 17, the apparatus or method may check at 16 and 18. When implementing this, if the probability that the mass/charge (m/q) bin has charge 17, the method/apparatus may look at 16 and 18; if either is bigger than 17, then it may take the probabilities for these and divide by 2 and may then also check 18 and 36.

These methods may work best over multiple iterations, which may allow them to converge to a local optimum that is parsimonious. These rules may therefore deliberately bias against a likely artifact, and may remove them later in the iteration and converge to a local optimum (e.g., put it into a space where the fixed point of the iteration is parsimonious). Any of these methods and apparatuses may also provide a measure of parsimony of the final results—e.g., may indicate a bias towards the answer that fits the date the best (e.g., well), but not completely optimally (e.g., 100 percent optimal) and may provide a parsimony score. This may be achieved by providing an after-the-fact scoring function that would get good parsimony score.

For the two kinds of artifacts discussed above (e.g., off-by-one, which may include or off-by-two, or off-by other integers), and harmonics, the methods and apparatuses described herein may divide up the problem into setting the charges for m/z and then adjusting the spectrum (e.g., "beautifying" the deconvolved spectrum). If the charges are correctly assigned, the method may solve the spectrum (neutral spectrum) and it will be less important to adjust ("beautify" the spectrum, e.g., by removing spurious peaks), however it may be more aesthetically pleasing. Thus, it may be most important to get the charges correct; therefore parsimony may be applied to determining the charge for m/z readings in the mass spectrum.

A method that takes into account the likely errors described above (e.g., including with difficult to distinguish charge states). These errors, including "off-by-one" and harmonics artifacts (which may be considered "factor of 2" artifacts in some variations), may be recognized and corrected when assigning charge vectors, as part of the application of the parsimony. The application of parsimony may also include making assumptions that change the expected number of molecules (e.g., 1 molecule, 2 molecules, 3 molecules, etc.) present in the spectrum, biasing towards the lowest number of molecules that can reasonably fit the data.

Figure 2A:
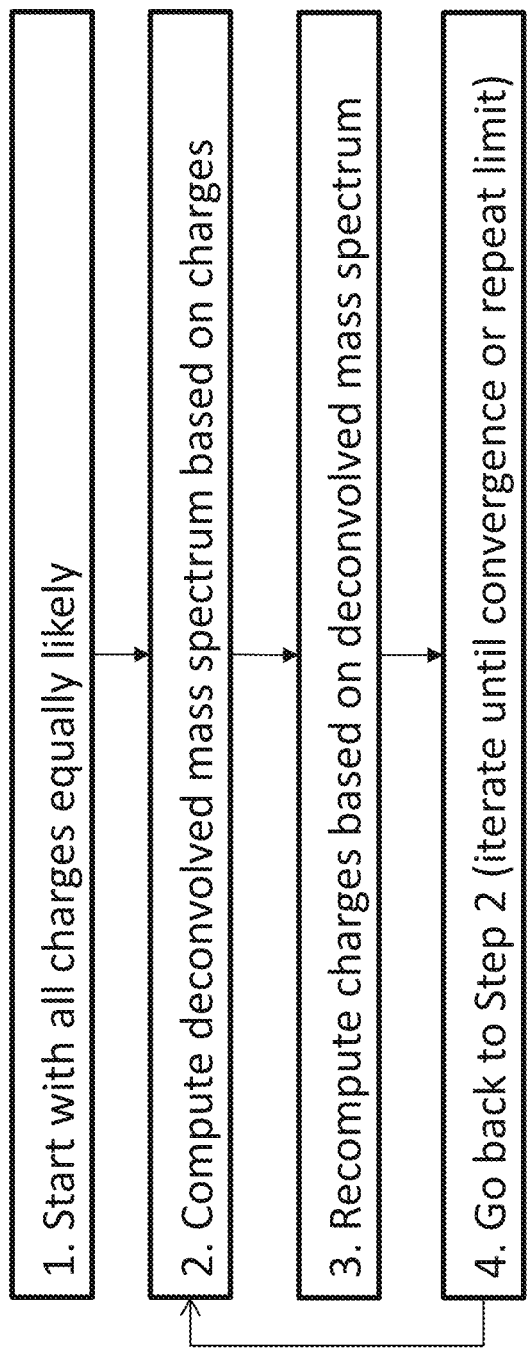
FIG. 2A shows an example of a deducing the charge state of a spectra by (1) starting with all charges equally likely, (2) computing a deconvolved mass spectrum based on this initial charge estimation, (3) then re-computing charges based on deconvolved spectrum, and iterating steps (2)-(3). Based on the peak size of the resulting spectrum, the charge may be determined to be more or less likely (e.g., larger peaks may indicate more likely).
Figure 2B:
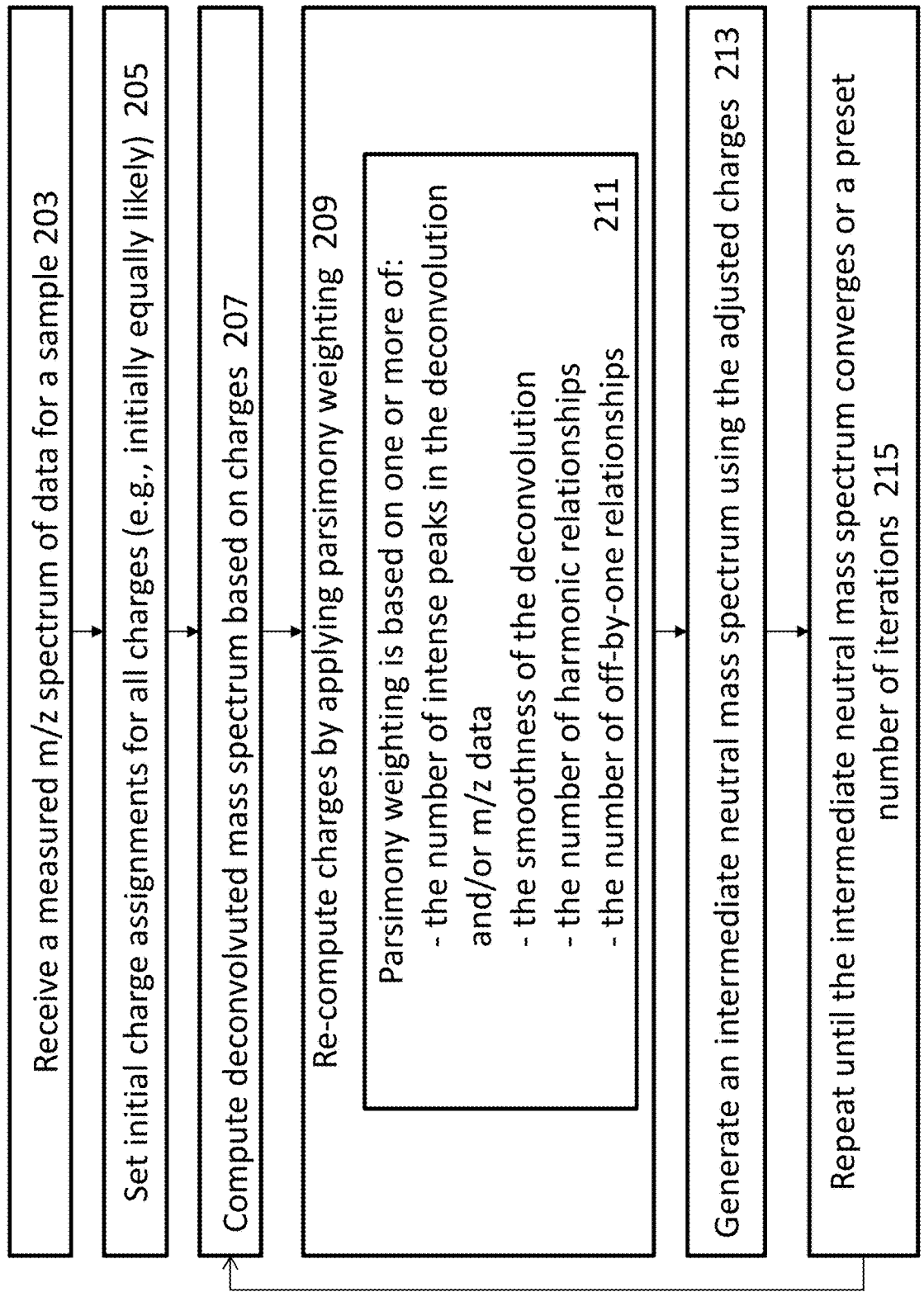
FIG. 2B illustrates a more detailed variation of the method shown in FIG. 2A.

FIG. 2B illustrates an example of a method of generating a parsimonious neutral mass spectrum (e.g., applying parsimony to deconvolute a m/z spectrum) that may be used to identify and/or characterize at least one property of a sample, For example, in FIG. 2B, a measured m/z spectrum of data for a sample may be received 203; this may include receiving it as a dataset from a spectrum analyzer or third party, and/or generating it and transferring the spectrum to a separate module or portion of an apparatus for analysis. The initial charge assignments for a number of estimated charge states of the measured m/z spectrum may then be stet 205. As mentioned, they may be set to a predefined value, including all the same (e.g., all equally likely), or they may be initially biased in some manner, particularly if there is a priori information about the sample. A deconvoluted mass spectrum based on these initial charge assignments may be made 207. Thereafter, parsimony weighting may be applied 209 to adjust the charge assignments and reduce the number of estimated charge states in the measured m/z spectrum. The expected number of molecules in the sample (e.g., ions) may also be reduced. The parsimony weighting may be based on 211 one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum. These are described herein greater detail herein.

An intermediate neutral mass spectrum may be created using the adjusted charge assignments (and in some cases the expected number of molecules/ions) 213. The process may then be iterated (e.g., repeating the steps of applying parsimony weighting and generating the intermediate neutral mass spectrum) to determine a parsimonious neutral mass spectrum 215. This iterative process may be stopped after the intermediate neutral mass spectrum either converges or after a predetermined number of iterations (e.g., 10, 20, 30, 40, 50, 60, 70, 80, 90, 100, 150, 200, 300, 400, 500, 600, 700, 800, 900, 1000, etc.). The intermediate natural mass spectrum converges once the magnitude of the changes between iterations falls below a threshold for change (e.g., 10% change or less, 5% change or less, 1% change or less, 0.1% change or less, 0.01% change or less, etc.). This process is typically performed automatically, e.g., by a processor performing the steps, and may be done very quickly. Upon completion, the parsimonious neutral mass spectrum may be used to identify or characterize at least one property of the sample. The at least one property may include the information described (e.g., visually or graphically) on a display of the parsimonious neutral mass spectrum.

Figure 9A:
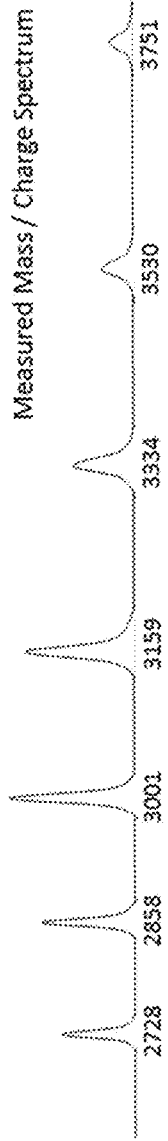
FIGS. 9A-9C schematically illustrates a method of applying parsimony as described herein.
Figure 9B:
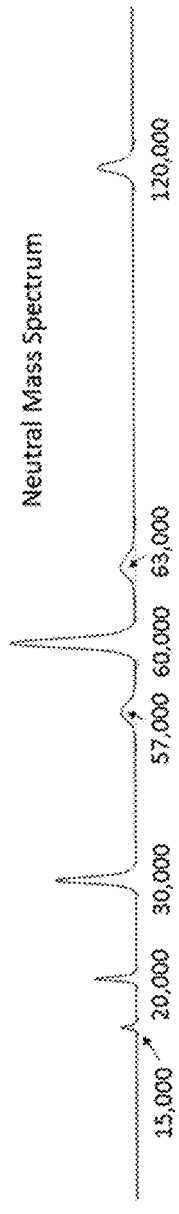
Figure 9C:
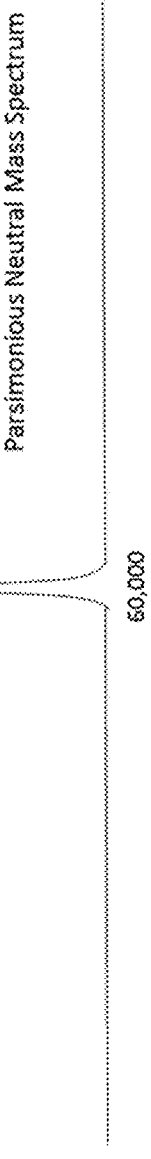

FIGS. 9A-9C show an overview of one method of deconvolution of a spectrum by applying parsimony. In FIG. 9A, the measured m/z spectrum includes peaks for molecular ions in various charge states. A neutral deconvolved mass spectrum is shown in FIG. 9B (middle) which assumes many molecules to explain the measured m/z spectrum. With this deconvolution, the peaks at m/z 2728, 2858, etc. are explained as charges 22+, 21+, etc. for a molecule with mass 60,000. In addition, every second peak, 2728, 3001, etc. includes a contribution from molecules of mass 30,000 with charges 11+, 10+, etc. Every third peak includes a contribution from molecules of mass 20,000 with charges 7+, 6+, etc. The peaks at 57,000 and 63,000 are from "off-by-one" charge assignments, that is, 2728, 2848, etc. given charges of 21+, 20+, etc., or 23+, 22+, respectively. The peak at 120,000 results from 2728, 2858, etc. having some probability of charges 44+, 42+, etc.

The parsimonious mass spectrum uses fewer molecules, and therefore suppresses or eliminates peaks corresponding to the low-probability molecules, as well as harmonics. The peaks at m/z 2728, 2858, . . . are explained as charges 22+, 21+, etc., with probabilities very close to 1.0, for a molecule with mass 60,000. Although the two mass spectra shown in FIGS. 9B and 9C have equal "goodness of fit" to the measured m/z spectrum, but the parsimonious mass spectrum is preferred on the grounds of plausibility.

For example, FIG. 6A shows an example of a mass spectrum for a glycosylated antibody (taken by Thermo Exactive EMR); a magnified view of a portion (boxed region B) is shown in FIG. 6B. A comparison of different deconvolution methods is shown in FIGS. 7A-7D, showing the intensity of the resulting peaks as well as charge states. In FIG. 7A, the raw data is shown for the 49+ charge state. FIG. 7B shows the raw spectrum deconvolved using a commercially available method ("Thermo Protein Deconvolution 4.0" that is also a maximum entropy method). FIG. 7C illustrates a second maximum entropy ("Waters MaxENT") method applied to deconvolve the same spectrum shown in FIG. 7A. Finally, FIG. 7D illustrates the parsimony method described above to deconvolve the raw spectrum of FIG. 7. As shown, the method of deconvolving using parsimony as described herein results in a much cleaner result, with fewer spurious peaks and with the resulting peaks more accurately comparing to theoretical values.

These results were confirmed by comparing the intensities of peaks, looking across charge states. In FIG. 8, the mass accuracy of most intensity peaks was compared across another exemplary (glycosylated) protein, showing that the parsimony methods described herein may be as good or better compared to the MaxENT methods commonly used.

Figure 10:
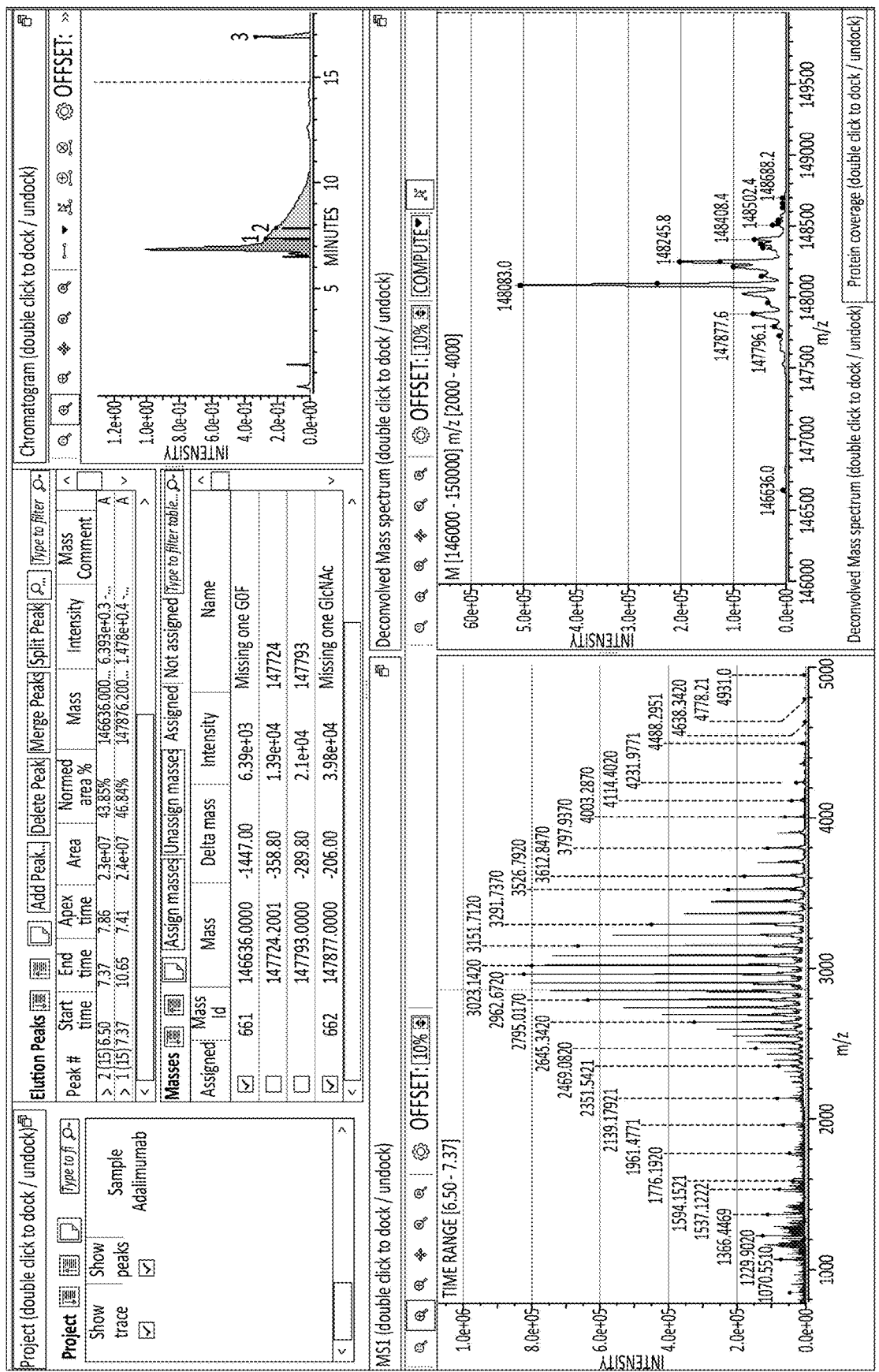
FIG. 10 illustrates one example of a user interface that may incorporate any of the features described herein, including deconvolution and/or sharpening.

FIG. 10 illustrates one example of a user interface that may incorporate any of the features described above (e.g., estimation of charge state, sharpening, and/or deconvolution using parsimony). In FIG. 10, the summed m/z scans are in the lower left, a chromatogram is shown in the upper right, deconvolved spectrum in shown in the lower right. The software allows the user to select and control the deblurring, as described above, for example by selecting the point spread function to be applied.

The user interface shown in FIG. 10 may allow an analyst (user) to define multiple chromatographic time windows for analysis, each with its own set of deconvolution parameters, allowing automated analysis of single samples or comparison between many samples. Tables and figures show side-by-side comparisons of assigned mass peaks and intensities from multiple samples.

The methods described herein (including any user interface implementing them) may apply the deconvolution (e.g., by parsimony) of charge states to transform m/z spectra to mass spectra.

EXAMPLES

Three therapeutic mAbs, namely Cetuximab (lot number 7663503, expiration date 3/2010), Daclizumab (lot number B0035, expiration date unknown), and Infliximab/Remicade (lot number and expiration date unknown) were used, and all commercially available. All mAb samples used likely represent expired batches. Properdin, also known as Factor P (Uniprot code: P27918), purified from human blood plasma, was obtained from Complement Technology, Inc. (Texas, USA). We obtained amino acid sequences from literature and Web searches (www.commonchemistry.org). All amino acid sequences lacked the N-terminal signal peptides (except Daclizumab, for which we used the sequence with signal peptide obtained from its European patent application: EP 2 527 429 A2) and specifications of the samples are known. Dithiothreitol (DTT), iodoacetamide (IAA) and ammonium acetate (AMAC) were purchased from Sigma-Aldrich (Steinheim, Germany). Phosphate buffer was from Lonza (Verviers, Belgium). Formic acid (FA) was from Merck (Darmstadt, Germany). Acetonitrile (ACN) was purchased from Biosolve (Valkenswaard, The Netherlands). Sequencing grade trypsin was obtained from Promega (Madison, Wis.). Lys-C, Glu-C, and Asp-N were obtained from Roche (Indianapolis, USA). PNGase F was obtained from Asparia Glycomics (San Sebastian, Spain). The IdeS enzyme for Cetuximab digestion was purchased from Genovis (Lund, Sweden).

The powder of the therapeutic mAbs was reconstituted in Milli-Q water. The aqueous mAbs samples and unprocessed protein solution (phosphate buffer at pH 7.2) containing ~30-40 µg of properdin were buffer exchanged with 150 mM aqueous AMAC (pH 7.5) by centrifugation using a 10 kDa cut-off filter (Merck Millipore, Germany). The resulting protein concentration was measured by UV absorbance at 280 nm and adjusted to 2-3 µM prior to native MS analysis. PNGase F was used to cleave the N-glycans of mAbs and properdin using protocols described earlier. Cetuximab was used to demonstrate the processing of native spectra of mAb treated by IdeS enzyme. The aquous Cetuximab (30 ug) was incubated with IdeS enzyme (30 units) in phosphate buffer at pH 7.5 for 30 min at 37° C. This sample was either submitted to the native MS measurements or further treated with 20 mM DTT and incubated for 30 min at 37° C. All samples were buffer exchanged to 150 mM AMAC (pH 7.5) prior to native MS measurements.

Samples were analyzed on a modified Exactive Plus Orbitrap instrument with extended mass range (EMR) (Thermo Fisher Scientific, Bremen) using a standard m/z range of 500-10,000, as described in detail previously. The voltage offsets on the transport multi-poles and ion lenses were manually tuned to achieve optimal transmission of protein ions at elevated m/z. Nitrogen was used in the higher-energy collisional dissociation (HCD) cell at a gas pressure of $6-8 \times 10^{-10}$ bar. MS parameters used: spray voltage 1.2-1.3 V, source temperature 250° C., source fragmentation and collision energy were varied from 30-100 V, and resolution (at m/z 200) 30,000 for properdin and 70,000 for mAbs. The instrument was mass calibrated as described previously, using a solution of CsI.

Proteolytic Digestion for Bottom up Proteomics. The mAb Daclizumab (5 µg) was reduced using 10 mM DTT at 56° C. for 30 min and alkylated with 30 mM IAA at room temperature for 30 min in the dark. The excess of IAA was quenched by using 10 mM DTT. The protein solution was first digested with Lys-C (or AspN, or GluC) at an enzyme-to-protein-ratio of 1:50 (w/w) for 4 hours at 37° C. and then overnight with trypsin at an enzyme-to-protein-ratio of 1:100 (w/w) at 37° C. The proteolytic digest was desalted by Oasis µElution plate[26], dried and dissolved in 40 uL of 0.1% FA prior liquid chromatography (LC)-MS and MS/MS analysis.

LC-MS and MS/MS analysis. Proteolytic peptides from Daclizumab (typically 300 fmol) were separated and analyzed using an Agilent 1290 Infinity HPLC system (Agilent Technologies, Waldbronn, Germany) coupled on-line to an Orbitrap Fusion Lumos Tribrid mass spectrometer (Thermo Fisher Scientific, Bremen, Germany). Reversed-phase separation was accomplished using a 100 µm inner diameter 2 cm trap column (in-housed packed with ReproSil-Pur C18-AQ, 3 µm) (Dr. Maisch GmbH, Ammerbuch-Entringen, Germany) coupled to a 50 µm inner diameter 50 cm analytical column (in-house packed with Poroshell 120 EC-C18, 2.7 µm) (Agilent Technologies, Amstelveen, The Netherlands). Mobile-phase solvent A consisted of 0.1% FA in water, and mobile-phase solvent B consisted of 0.1% FA in ACN. The flow rate was set to 300 nL/min. A 45 min gradient was used as followed: 0-10 min, 100% solvent A; 10.1-35 min 10% solvent B; 35-38 min 45% solvent B;

38-40 min 100% solvent B; 40-45 min 100% solvent A. Nanospray was achieved using a coated fused silica emitter (New Objective, Cambridge, Mass.) (outer diameter, 360 μm; inner diameter, 20 μm; tip inner diameter, 10 μm) biased to 2 kV. The mass spectrometer was operated in positive ion mode and the spectra were acquired in the data dependent acquisition mode. For the MS scans the scan range was set from 300 to 2,000 m/z at a resolution of 60,000 and the AGC target was set to $4\times10^5$. For the MS/MS measurements HCD and electron-transfer and higher-energy collision dissociation (EThcD) were used. HCD was performed with normalized collision energy of 35%. A supplementary activation energy of 20% was used for EThcD. For the MS/MS scans the scan range was set from 100 to 2,000 m/z and the resolution was set to 30,000; the AGC target was set to $5\times10^5$; the precursor isolation width was 1.6 Th and the maximum injection time was set to 300 ms.

LC-MS/MS data analysis. Raw LC-MS/MS data on the digest of Daclizumab were interpreted using Byonic software (Protein Metrics Inc.). The following parameters were used for data searches: precursor ion mass tolerance, 10 ppm; product ion mass tolerance, 20 ppm; fixed modification, Cys carbamidomethyl; variable modification, Met oxidation. A semitryptic specificity search was chosen for all samples. The protein database contained the Daclizumab protein amino acid sequence.

An m/z spectrum is a sequence of pairs $m_i=(x_i, y_i)$, where $x_i$ is the m/z value and $y_i$ is the intensity value. Most often the intensity $y_i$ represents a single species of ions, but in general, the intensity represents a mix of ions of various charges, and we let $c_k(m_i)$ denote the fraction of the intensity that has charge k for k=1, 2, . . . , up to some maximum charge. For each i the sum of $c_k(m_i)$ values over all k is one. The $c_k(m_i)$ values are initially unknown and set to be equal, but the algorithm iteratively learns these values as it learns the neutral mass spectrum.

An observed m/z value $m_i$ maps to a sequence of neutral masses, $k \cdot x_i - k \cdot 1.00728$, with intensities $c_k(m_i) \cdot y_i$ for k=1, 2, . . . . Here we are assuming positive-mode MS; for negative mode the neutral mass is $k \cdot x_i + k \cdot 1.00728$, where 1.00728 is the mass of a proton in Daltons. We can compute a full neutral mass spectrum by accumulating, over all $m_i$, the intensities $C_k(M_3) \cdot y_i$ into a vector at the appropriate x-values, $k \cdot x_i - k \cdot 1.00728$. The result of this m/z-to-mass "backward" mapping is a sequence of points, $M_j=(X_j, Y_j)$. For each point $M_j$ in the neutral mass spectrum, we can also keep a record of the intensity contributions $C_k(M_j)$ from each charge k, and normalize these contributions so that for each j the $C_k(M_j)$ values sum to one. The $M_j$ points and $C_k(M_j)$ values can be used in a mass-to-m/z "forward" mapping to give a modeled m/z spectrum. Alternation of backward and forward mappings improves the values of the unobserved $c_k(m_i)$, $C_k(M_j)$, and $Y_j$ variables. The computation stops after a predefined number of iterations or when the neutral mass spectrum converges, meaning that it changes very little between iterations.

The quality of a deconvolution can be evaluated by various criteria, and deconvolution algorithms either implicitly or explicitly aim to optimize an objective function that combines the criteria. To our knowledge, none of the maximum entropy algorithms disclose their objective functions or optimization algorithms; however, the primary criterion is always goodness of fit, which can be measured by forward mapping the neutral mass spectrum to an m/z spectrum and then evaluating, for example, the sum of the squares of the differences between the observed and computed values. A second criterion is smoothness of charge distributions $C_k(M_j)$. Maximum entropy methods add into the objective function a weighting factor times the Shannon entropy of the neutral mass spectrum regarded as a probability distribution, that is, the sum over j of $-\dot{Y}_3 \log_2 \dot{Y}_j$ where $\dot{Y}_j = Y_j/\Sigma Y_j$. The entropy criterion tends to split broad peaks into multiple sharper peaks.

In the algorithm used here, we introduce a new criterion based on the assumption that m/z coincidences are rare, especially in highly resolved mass spectra, so that for each i the intensity at m/z point $m_i$ is more likely to derive from a single mass value than from two masses, more likely to derive from two masses than from three, and so forth. This criterion tends to drive the iteration to a "parsimonious" neutral mass spectrum that contains a minimal set of mass peaks to explain the m/z spectrum. Notice that if the sample does contain a problem pair of masses, say a monomer and a dimer, each $m_i$ point may still be fairly pure if there is some separation in m/z, for example, if the dimer cannot carry twice the charge of the monomer. Separation in m/z is less reliable in mass spectra taken under "standard" denaturing conditions than in native mass spectra, in which different oligomers tend to claim distinct m/z ranges. If there is no separation in m/z, then the dimer explains every m/z peak explained by the monomer, and the evidence for the monomer is merely taller m/z peaks at even charges of the dimer. In this case, the monomer's intensity in the computed neutral mass spectrum depends upon the relative weighting of the parsimony and charging smoothness criteria.

Figure 11:
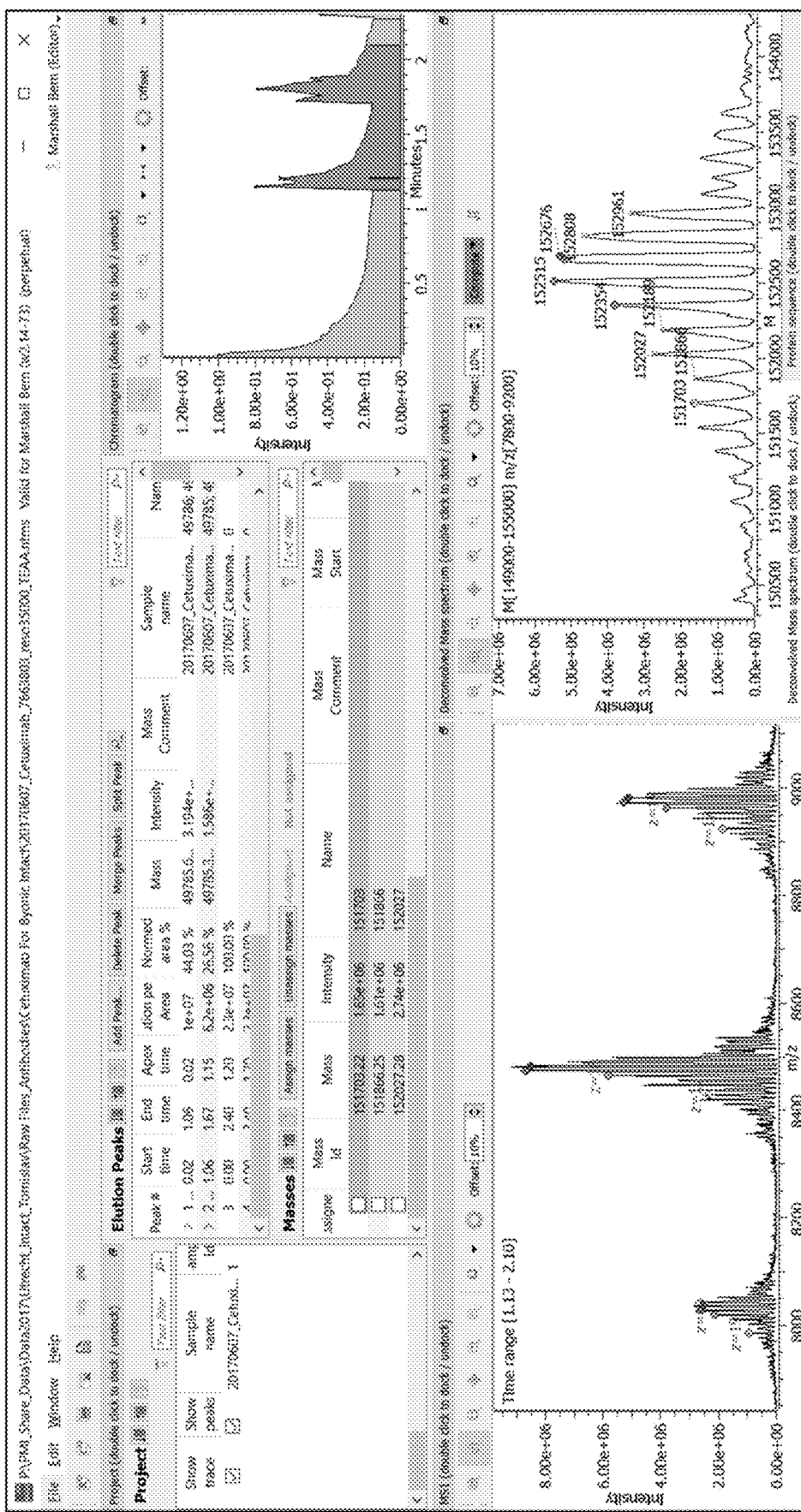
FIG. 11 shows a screenshot of a software interface that may form part of the apparatuses described herein. The software applied to the mAb Cetuximab may provide tables of input files, elution peaks, and detected masses (upper left); total ion chromatogram (upper right); m/z spectra (lower left) summed over the selected time window; and deconvolved neutral mass spectrum (lower right). Mass peaks are interactively connected to m/z peaks by colored dots. The mass peak at 152,354 is a good match for the calculated average isotope mass of 152,356 Da for Cetuximab with G2FGal2 on its Fab glycosylation sites and G0F on its Fc glycosylation sites. 152,515 and 152,676 match G2FGal2 Fab glycosylation with one- and two-G1F Fc glycosylation.

We implemented the new charge inference method in C++ in a commercial product called Protein Metrics Intact or PMI Intact, shown in FIG. 11. Input data from almost any type of MS instrument can be sliced by elution time into any number of possibly overlapping time windows, and summed mass spectra for each time window can be further sliced by m/z for separate deconvolution. Both m/z and mass point spacing are user-controllable; mass spacing below about 0.2 Da preserves isotope resolution. We also implemented Richardson-Lucy point spread deconvolution, which we call "peak sharpening" to avoid confusion. This iterative algorithm takes as input 1D or 2D signals (such as a time series, mass spectrum, or image), along with a point spread function F, and computes an output whose convolution with F gives a result close to the observed input. The current version of the software (v1.6-52, released in July 2017) lets the user define point spread functions with Gaussian or Lorentzian, possibly asymmetric, tails. Gaussian tails approximate isotope distributions and measurement inaccuracy; heavy Lorentzian tails may approximate adducts. PMI Intact also includes interactive visualization. Peaks in the deconvolved mass spectrum may be selected interactively, and the software marks the selected peaks and the m/z points that map to these peaks with matching colored dots for human inspection and validation. The software also enables automatic peak assignment from protein sequences, masses, or mass deltas, as well as automatic graphical report generation.

PMI Intact is currently in use for a diverse set of applications including analysis of both reduced and intact monoclonal antibodies, Ides-digested and intact bispecific antibodies, antibody-drug conjugates, DNA oligos, heavily glycosylated glycoproteins, protein-ligand binding, and non-covalently bound protein complexes up to 1 MDa or more.

Software Tests. We tested PMI Intact on data from properdin and the three antibodies Daclizumab, Infliximab, and Cetuximab. Experimental high-resolution native MS data was already published for properdin and therefore represented an ideal test-case to demonstrate the power of this new algorithm. The three antibodies were chosen because they presented interesting analytical challenges, due to their complex glycosylation profiles and/or extensive protein processing characteristics. We benchmarked PMI Intact against Protein Deconvolution 4.0 (Thermo Fisher Scientific) on the properdin data, using identical m/z and mass ranges for the two programs. For PTM composition analysis, data were interpreted manually and glycan structures were deduced based on known biosynthetic pathways. Average masses were used for the PTM assignments, including hexose/mannose/galactose (Hex/Man/Gal, 162.1424 Da), N-acetylhexosamine/N-acetylglucosamine (HexNAc/GlcNAc/GalNAc, 203.1950 Da), and N-acetylneuraminic acid (NeuAc, 291.2579 Da). All used symbols and text nomenclature are according to recommendations of the Consortium for Functional Glycomics.

Results

Figure 12A:
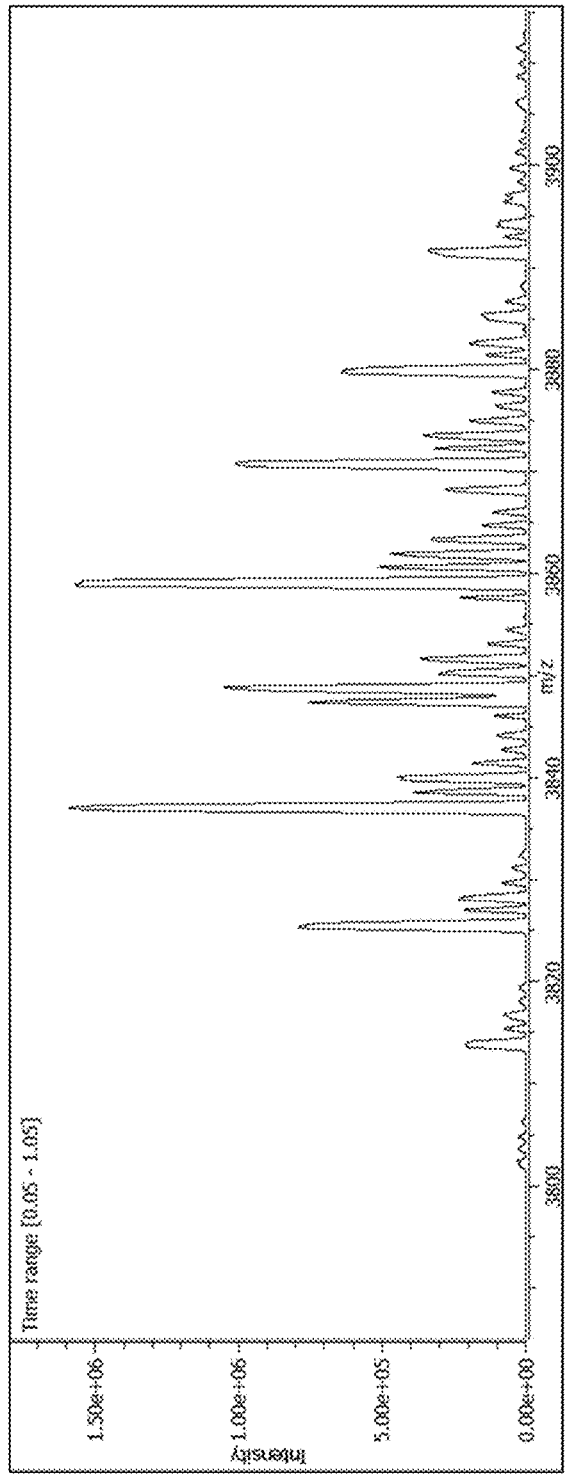
FIGS. 12A-12B illustrate proteoform profile of monomeric properdin.
Figure 12B:
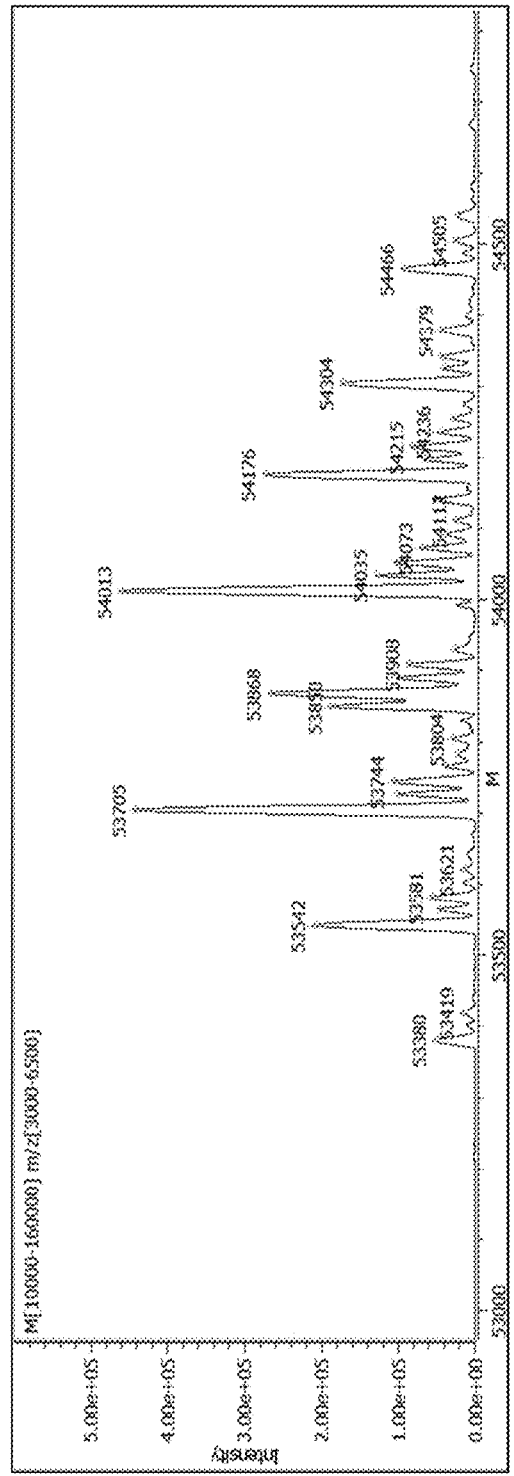
Figure 12C:
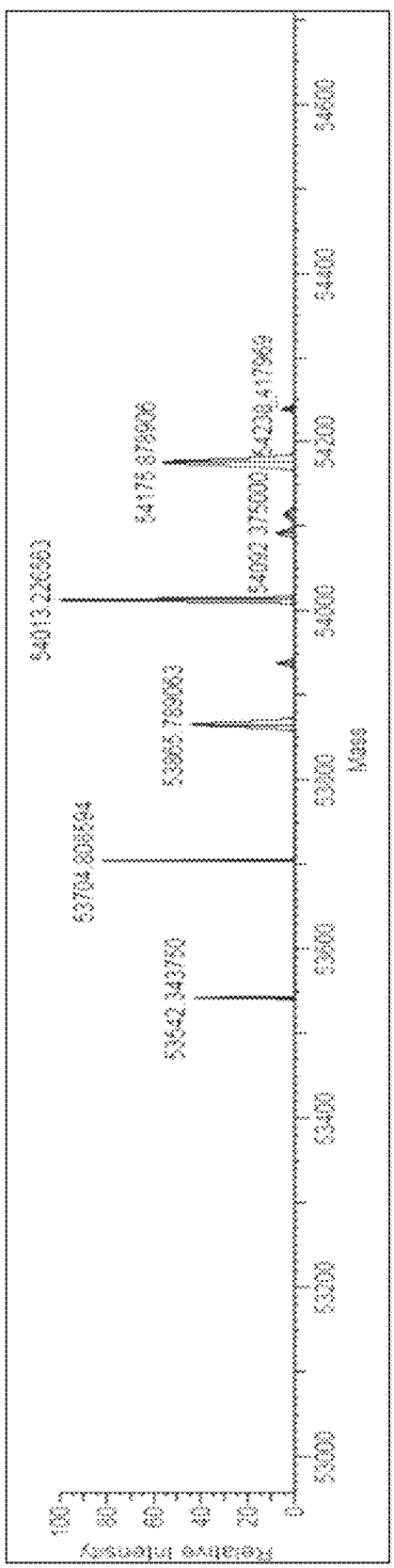
FIG. 12C shows a zoomed-in view of Thermo deconvolution computed on the same m/z and m ranges. Thermo deconvolution misses a number of proteoforms, including abundant forms at 53380, 54304, and 54466, most likely due to interference from the dimer.

As a first demonstration of the value of parsimony in the deconvolution of ESI mass spectra, we reanalyzed published high-resolution mass spectra on the plasma protein properdin. This protein may exist in various oligomeric states, and harbors a diversity of modifications on various sites, including N- and O-glycosylation, as well as C-mannosylation, making properdin a challenging target for structural analysis. Our initial native MS measurements revealed monomer and dimer of properdin. We first tested whether Protein Metrics Intact and Thermo Protein Deconvolution 4.0 could find both monomer and dimer using m/z and mass ranges large enough to accommodate both forms; this is a challenging problem for charge deconvolution algorithms due to coincidences of m/z peaks. Protein Metrics Intact gives an accurate deconvolution, but depending upon input parameter settings, Thermo Protein Deconvolution 4.0 either gives numerous large artifact peaks or loses the dimer form altogether, and it was impossible to find a setting that gave an accurate deconvolution. FIG. 12A-12C shows a more detailed comparison of Protein Metrics and Thermo deconvolutions, alongside the major charge state from the m/z spectrum previously used for manual analysis[16]. When deconvolved with wide m/z and mass ranges, Thermo software, along with losing the dimer form, loses many of the medium abundance monomer proteoforms, yet finds some of the lower abundance proteoforms, possibly because they are at half the mass of dimer forms. Thermo also gives highly variable peak widths. A wide mass peak in a deconvolved mass spectrum generally indicates mass uncertainty, caused by m/z peaks with different charges mapping to slightly different m's, but in this case the wide mass peaks at 53,866 and 54,176 Da seem to be caused by dimer m/z peaks mistaken for monomer. PMI Intact returns a deconvolution in good visual agreement with the major charge states of the m/z spectrum, and mass agreement within ±2 Da of the correct previous assignments of the properdin peaks. The previous assignments were made by manual inspection from m/z peaks and have poorer mass agreement, as well as several errors apparent from the improved resolution and mass accuracy of Intact's deconvolved spectrum. PMI Intact gave about 25 interpretable species in this analysis. PMI Intact also revealed relatively high abundance of salt adducts (i.e. Na$^+$ and K$^+$) to some of the ion species. Based on this knowledge we also analyzed a further desalted properdin sample by native MS, for which we obtained spectra nearly free of salt of adducts, enabling us to find evidence for a low abundance of tri-antennary N-glycans, whose assignments could be confirmed by bottom-up glycopeptide analysis. Interestingly, the tri-antennary N-glycans were found on proteoforms with 15 C-mannosylations, but not on those with fewer C-mannosylations, not even those with 14 C-mannosylations, which are most abundant in this sample. This is evidence of whole-protein correlation between PTMs that could not easily be obtained from bottom-up, middle-down, or top-down fragmentation spectra of a 54 kDa protein with 20 labile PTMs.

Figure 13A:
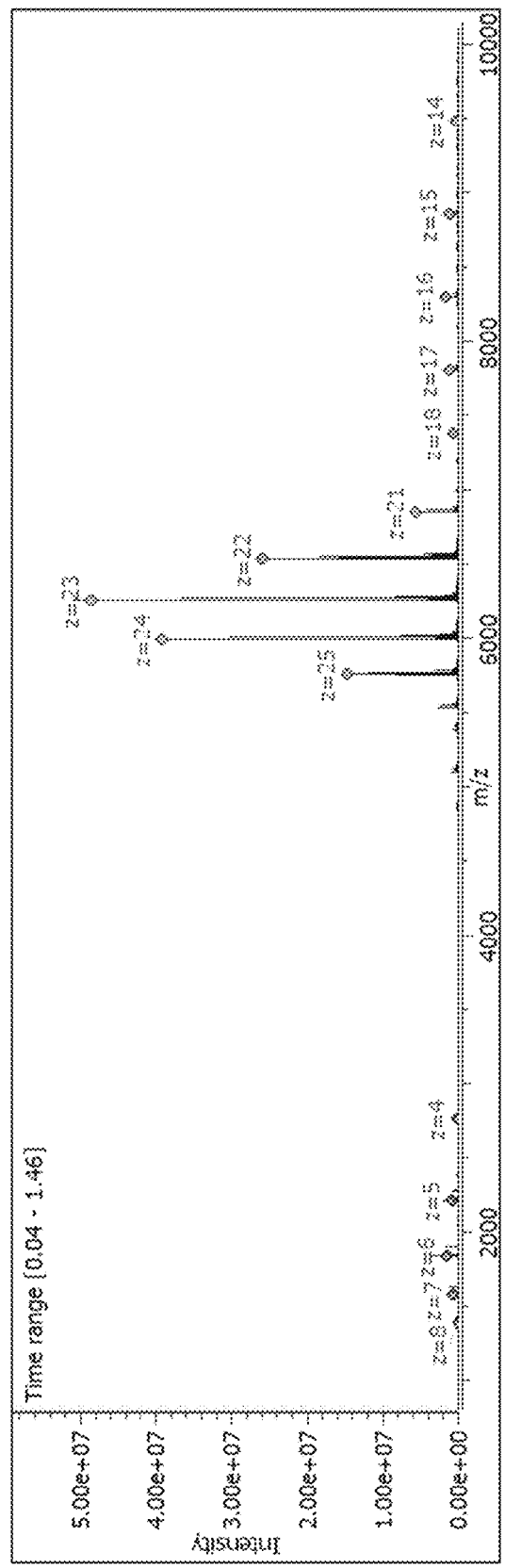
FIGS. 13A-13C illustrate full range m/z and deconvolved native ESI mass spectra of the deglycosylated mAb Daclizumab.
Figure 13B:
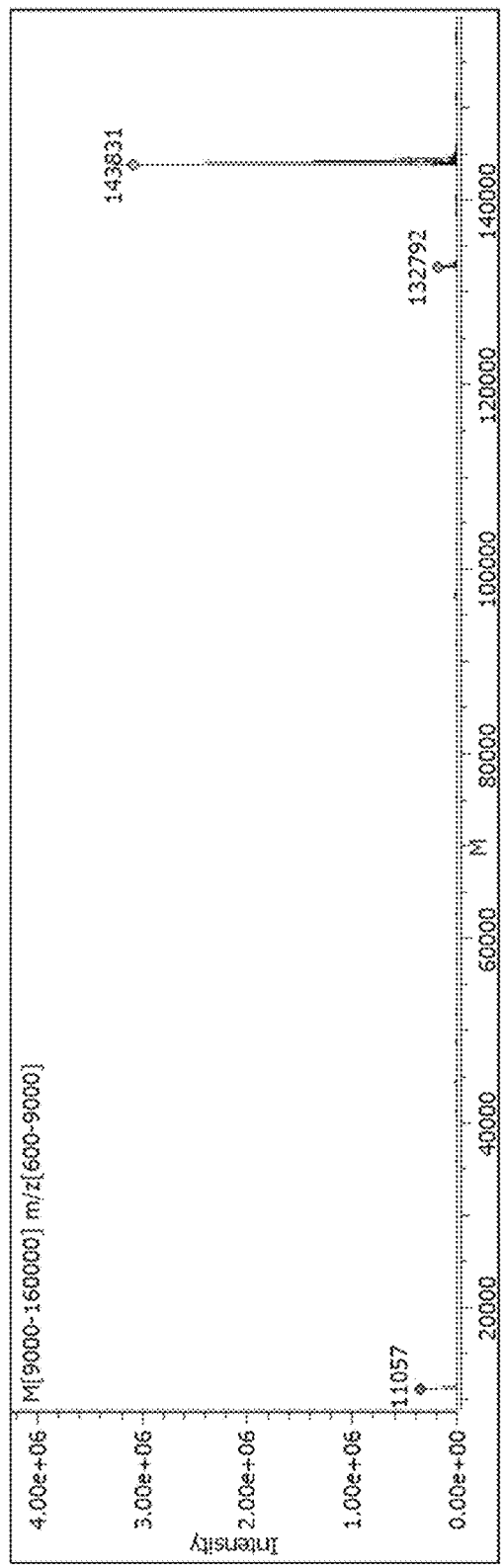
Figure 13C:
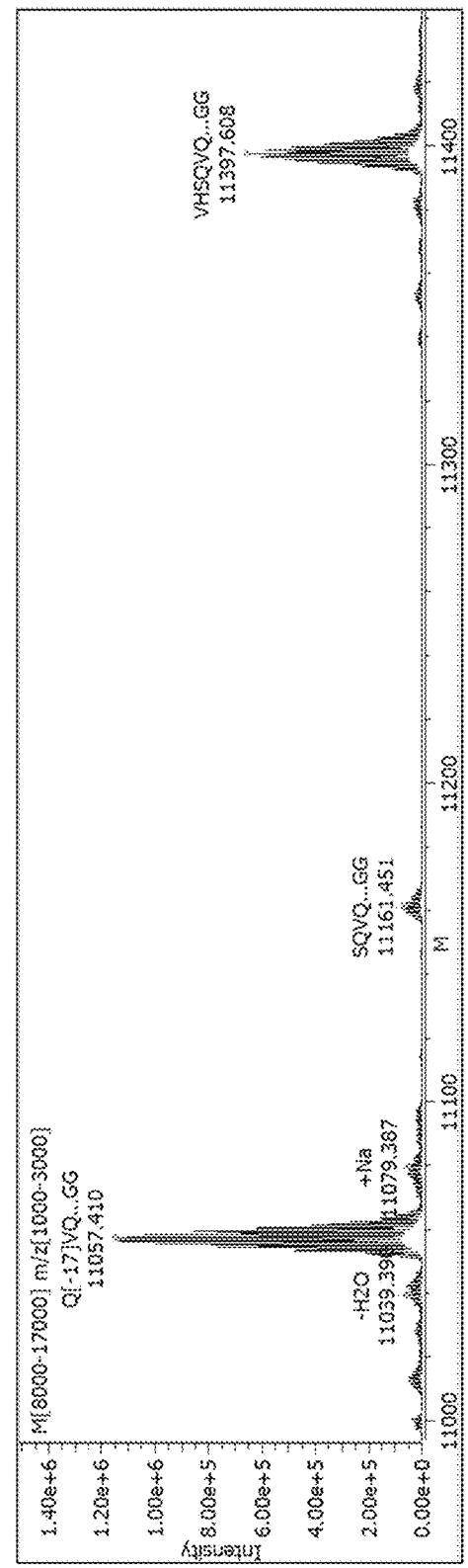

As a further demonstration of the utility of the new deconvolution algorithm to target protein therapeutics, we analyzed three clinically approved and used mAbs. As a first example in FIGS. 13A-13C show results on the PNGaseF-treated deglycosylated mAb Daclizumab. Somewhat surprisingly we observed three quite distinct masses in the deconvolved spectrum, namely at 11,057 Da, 132,792 Da, and 143,831 Da, along with +340 Da masses for each of these peaks, and 2×340 Da for the 143,831 Da species only. The calculated mass for deglycosylated Daclizumab is 143,832 Da=2×48,717 (heavy chain)+2×23,215 (light chain)−32 (for the 16 disulfide bonds). The 11,057 Da species is an exact integer match to the average isotope mass of the known heavy chain initial sequence with N-terminal pyro-Glu and the expected single disulfide bond. The molecule includes a G.G site, which is a well-known clipping site for monoclonal antibodies, attributed to the flexibility of GG, and in this case the even-more-flexible GGG sequence occurs in the heavy chain CDR3, making it solvent-accessible. The mass 132,792 Da corresponds to the full-length mAb minus the initial sequence ending in GG. The fact that the mass of the observed fragments minus the mass of the intact mAb, (132,792+11,057)−143,831=18 Da, gives the mass of water, reveals that hydrolysis is causing the cleavage rather than gas-phase fragmentation inside the mass analyzer. The extra +340 Da peaks are consistent with an N-terminal extension of VHS (part of the signal peptide). A small peak for S, with measured mass delta (104.041 Da≈87.032 for S+17.027 for pyroQ) correct to less than 0.02 Da, which is 2 ppm, in isotope-resolved FIG. 13C supports this interpretation. FWHM (full-width half-maximum) peak widths at m/z 1900 are about 0.08, sufficient to resolve isotopes of 11 kDa masses. FWHM of the full mAb peaks at m/z 6000 are about 0.9, limited by the isotope distribution of the molecule (calculated FWHM of 1 at m/z 6000) rather than by instrument resolution, which should be below 0.2 at 6000 m/z as Orbitrap resolution decreases with the square root of m/z.

We based the interpretation of GG clipping and VHS extension only on the deconvolved mass spectra and protein sequence; this inference would be difficult without high-resolution mass spectrometry and accurate artifact-free deconvolution. We then searched our bottom-up proteomics data for nonspecific peptides and peptides with N-terminal extensions, and the search results confirmed our interpretation. The information from the native MS data prompted us to look for these features in the LC-MS/MS peptide data.

Figure 14A:
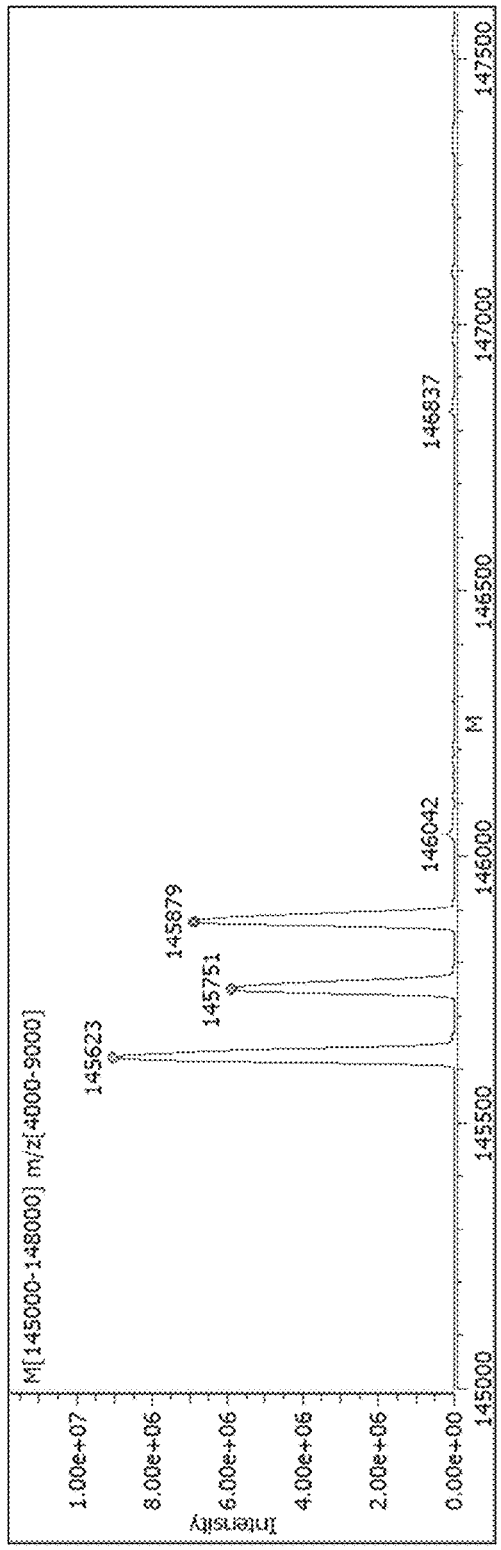
FIGS. 14A and 14B illustrate examples of a deconvolved high-resolution native mass spectra of the deglycosylated and glycosylated mAb Infliximab.
Figure 14B:
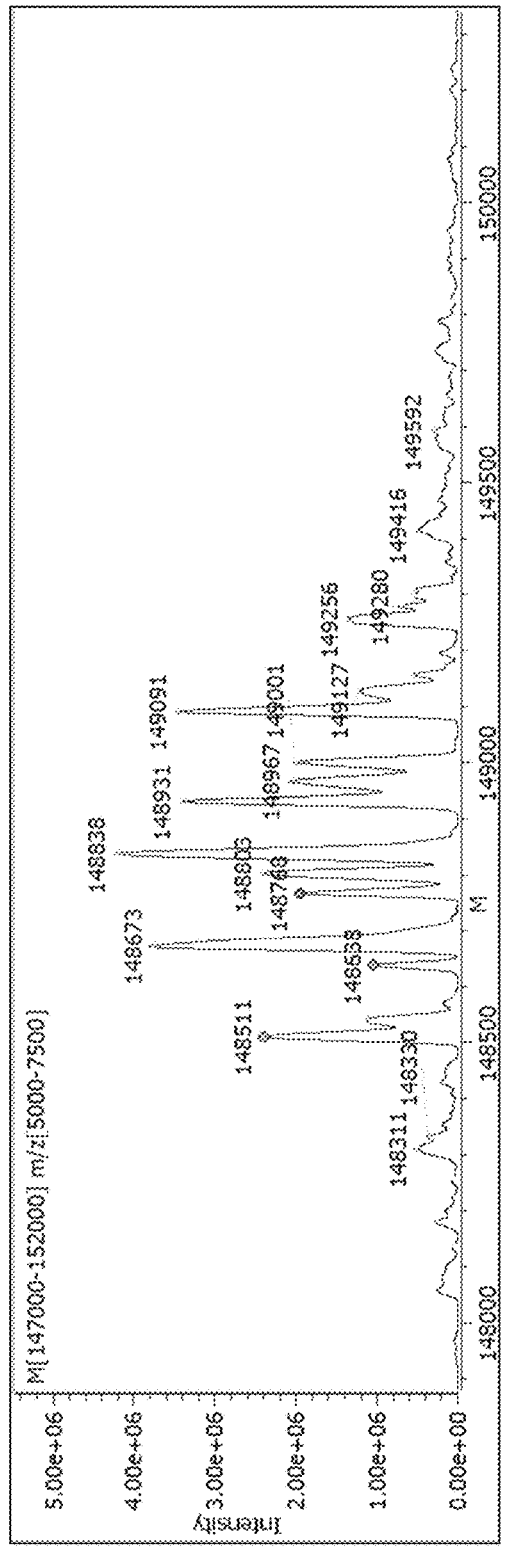
Figure 15A:
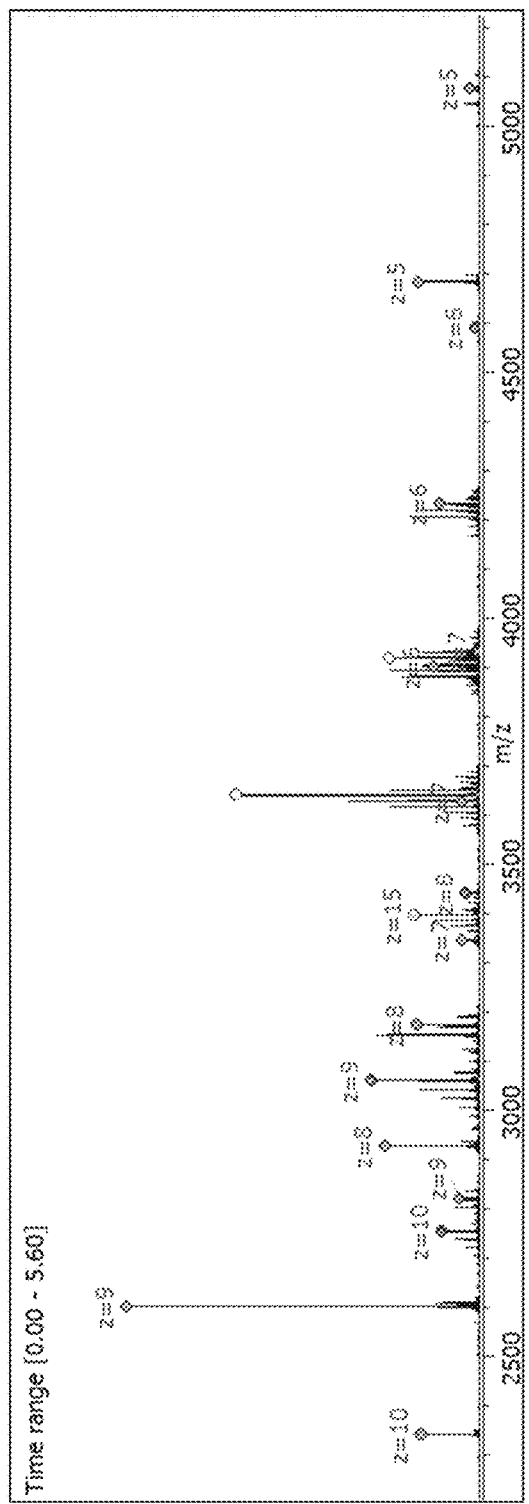
FIGS. 15A-15D illustrate high-resolution native mass spectra and deconvoluted masses of the IdeS-digested and reduced mAb Cetuximab. Deconvolution of the full m/z range (shown in FIG. 15A) of Cetuximab shows mass clusters (shown in FIG. 15B) at about 23.4, 25.4, 27.5 and 50.5 kDa, corresponding to the light chain LC, the glycosylated Fc/2, the glycosylated Fd, and the glycosylated Fc, respectively. A zoom of the 23-28 kDa range (c) shows good agreement to the theoretical masses of 23,423 Da for the LC with intrachain disulfide bonds, 25,233 Da for Fc/2+G0F, and 27,543 for Fd+G2FGal(2). A further zoom in of the 26-29 kDa range (d) shows the more complicated Fab-arm/Fd glycosylation, including Gal-α-Gal and antennal fucosylation.
Figure 15B:
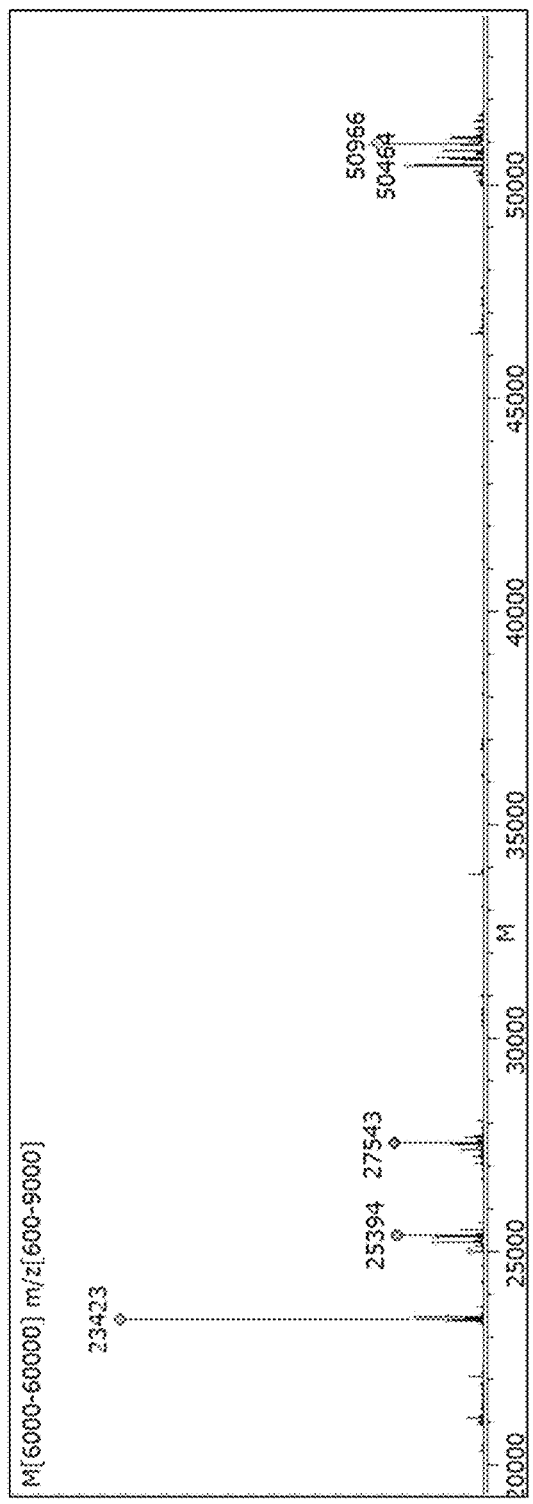
Figure 15C:
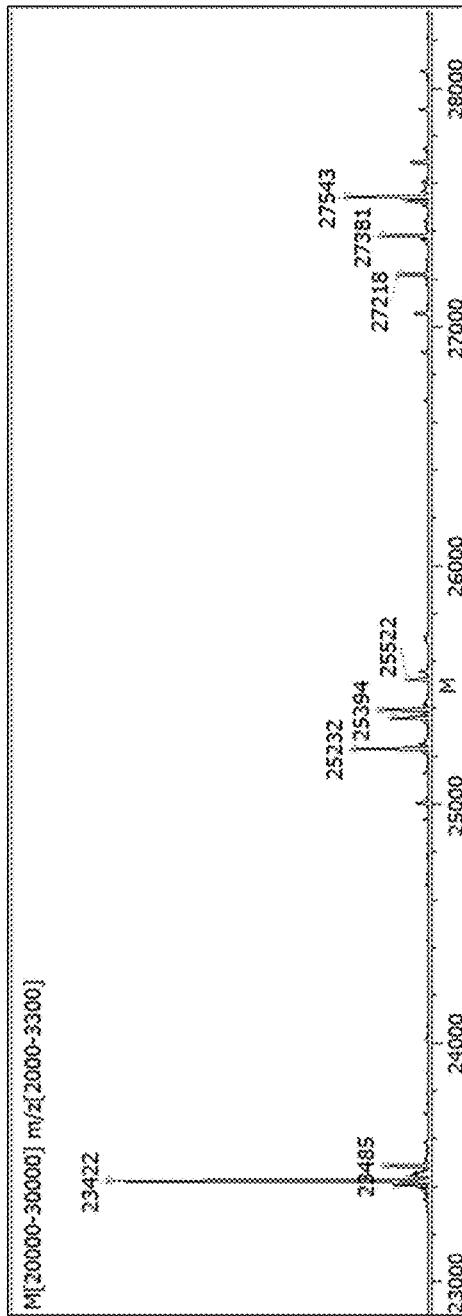
Figure 15D:
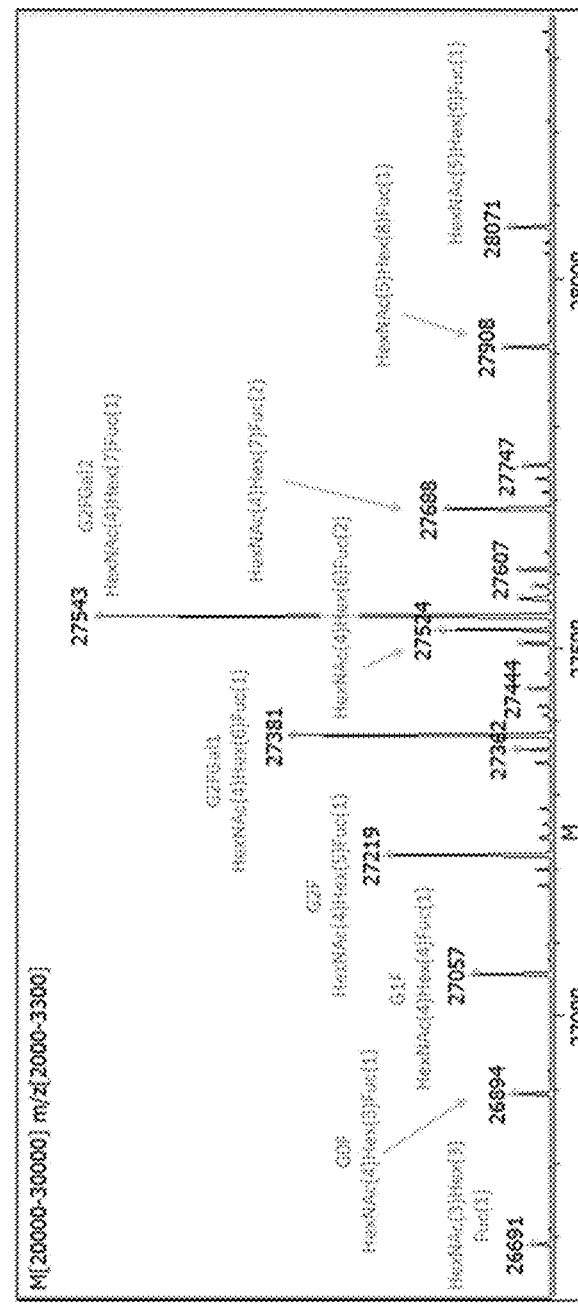

Next, we targeted the mAb Infliximab. We first analyzed deglycosylated Infliximab, because the spectrum of the deglycosylated antibody, displayed in FIGS. 14A-14B, helps to interpret the more complicated spectrum of non-deglycosylated Infliximab. The peak at 145,623 Da is a an exact match for the calculated deglycosylated mass of 145,623 Da, and the mass deltas of +128 Da for the other two large peaks in the deglycosylated Infliximab are exact integer matches for C-terminal lysines, a modification known to occur frequently in recombinant mAbs. The presence of this triplet of mAb species harboring zero, one, and two C-terminal lysines leads to a denser and more complicated spectrum for non-deglycosylated Infliximab. The peaks at 148,511, 148,638, and 148,768 Da in the glycosylated Infliximab spectra can be assigned as matches to proteoforms with two N-glycans with composition G0F (=HexNAc(4)Hex(3)Fuc(1)) (with average-isotope additional mass of 2,891), along with zero, one, and two C-terminal lysines.

Extending the complexity of the targeted mAb still further, we next analyzed Cetuximab, as far as we know the only therapeutic antibody in current clinical use that has, along with the usual Fc glycosylation site, an additional glycosylation site in the Fab region. Therefore we chose to digest Cetuximab with IdeS[29] to separate Fab and Fc. IdeS digestion produces a F(ab')2 component. Reduction with DTT then reduces the F(ab')2 into Fd subunits, that is, the heavy chain from the N-terminus up to . . . PAPELLG, but often leaves disulfide bonds within subunits intact. After IdeS digestion, the Fc may appear as either ~50 kDa Fc species held together noncovalently or ~25 kDa Fc/2. High-resolution native MS data acquired for this whole mixture of species, i.e. the light chain LC (~23 kDa), the glycosylated Fc/2 (~25 kDa), the glycosylated Fd (~27 kDa), and the glycosylated Fc (~50 kDa), processed by Protein Metrics Intact deconvolution, gave results in close agreement with a previous detailed analysis of Cetuximab Fab glycosylation[30], except that we noted now that the previous analysis misidentified peaks at 27,688, 27,832, and 28,216 Da as glycans with somewhat unusual GlcNAc-Gal-GlcNAc antennas. These misidentifications may stem from arithmetic mistakes as the masses are each off by about 100 Da. We interpret the peak at 27,688 Da as HexNAc(4)Hex(7)Fuc(2), that is, a glycan with antennal Fuc, which gives an exact mass match to the closest integer, and connects biosynthetically to the most abundant glycoform in the deconvolved spectrum, HexNAc(4)Hex(7)Fuc(1). FIG. 15 includes small unlabeled peaks at 27,834 and 28,215, which are within 2 Da of the misidentified peaks in the previous analysis and also within 2 Da of the theoretical masses for the Fd with HexNAc(4)Hex(7)Fuc(3) and HexNAc(5)Hex(9)Fuc(2), respectively. The deconvolved spectrum includes at least 14 recognizable Fd glycoproteoforms over a hundred-fold dynamic range. In native MS on intact proteins glycoproteoforms with and without sialic acids have similar ionization propensities and gas-phase stabilities, and hence peak intensities in the deconvolved mass spectrum should give accurate relative quantification.

Based on the detailed analysis of the IdeS induced fragments of Cetuximab we were also able to annotate many of the abundant ion signals in the complicated intact Cetuximab spectrum. Summing 23,422 (LC), 27,543 (Fd+G2FGal2), and 25,232 (Fc/2+G0F) from FIG. 15C, and then multiplying by 2 and subtracting 36 Da for gain of water from IdeS digestion along with 4 for interchain disulfide bonds gives a mAb proteoform at 152,354, a perfect match for the peak with the orange dot in FIG. 11. The peak at 152,515 then represents a proteoform with G1F on one of the Fc sites; this peak is taller than 152,354, because G1F has almost equal abundance as G0F in FIGS. 15b and 15c, and there are two chances for an extra Gal. The peaks at 151,866, 152,027, 152,189, and 152,676 are interpretable as proteoforms differing in number of galactose monosaccharides. The peaks at 152,808 and 152,961 probably contain unresolved proteoforms, including multiple fucosylation on the Fd.

For the past 25 years, charge deconvolution of protein ESI-MS data has almost exclusively been performed by some implementation of the maximum entropy algorithm. During this time period, MS instruments and associated technologies such as chromatography and sample handling have improved in speed, resolution, and sensitivity, and partially as a consequence of technology improvements, the variety, complexity, and masses of target molecules for intact and native MS have increased significantly. Therefore, high-resolution native MS is now widely adopted by the pharmaceutical industry to characterize some of their most important protein therapeutics, such as the mAbs analyzed here. These developments motivate the development of accurate, automated, and user-friendly deconvolution programs that can handle more difficult data with less user intervention and validation.

A primary contribution of the work presented here is the use of parsimony in charge deconvolution. Parsimony is a guiding principle in other inverse problems arising in bioinformatics including phylogeny reconstruction from genomic data and protein inference from proteomics data. Due to its use of parsimony, Protein Metrics Intact gave fewer and smaller artifact peaks than Protein Deconvolution 4.0 on a complicated monomer/dimer example. Artifact reduction is important whenever the sample contains, or could possibly contain, molecules spanning a wide mass range, for example, light and heavy chains, monomers and dimers, or full proteins and clips.

The methods and apparatuses described herein reflect or include the "factorization" of charge deconvolution into two sub-problems: charge inference and super-resolution. The two subproblems are not closely connected, even though they can both be solved by iterative algorithms. In the case of maximum entropy methods, the two sub-problems are actually antagonistic, as accurate charge inference tends to decrease entropy and super-resolution explicitly aims to increase entropy. Decoupling the two problems will enable mass spectrometrists to work on charge inference, a problem unique to the field, while borrowing and adapting well-developed super-resolution algorithms from astronomy, geophysics, and so forth.

Although we chose the samples primarily as demonstrations of the new algorithm, our studies did reveal some unexpected characteristics of the targeted mAbs and properdin. For properdin we identified several novel low abundant proteoforms harboring tri-antennary N-glycans, seemingly exclusively on proteoforms with 15 C-mannosylations. These new proteoforms went unnoticed in our earlier work, due to the presence of salt adducts and the lack of a charge deconvolution program that could handle such difficult data. For Daclizumab, we found both N-terminal extension and GG clipping, which to our knowledge have not been previously published. Such information is important to drug manufacturers, because the clipped proteoform may have completely different therapeutic effects than the intact monoclonal antibody. Our Daclizumab sample, however, was already quite old and possibly past its expiration date, so the clipping may be due to extended storage. For Cetuximab, we showed an analysis of a mAb with both Fc and Fd glycosylation using a combination of native MS with the new deconvolution algorithm, along with IdeS digestion to separate subunits, and bottom-up proteomics to confirm identified glycoforms, including glycans on the Fd site with antennal fucose.

Native MS is advantageous for analysis of mAbs and plasma glycoproteins. Native MS gives greater separation between charge states. Without this separation, properdin and Cetuximab would most likely give overlapping m/z states, which would seriously hamper deconvolution and visual validation. Another advantage of native MS for these target molecules is improved dynamic range; fewer charge states and lower charge means that there is more trap capacity available for minor species, such as the clipped N-terminal sequence in Daclizumab. On the other hand, native MS generally requires more starting material than intact MS on denatured proteins, and native MS can lose resolution on FTICR and Orbitrap instruments by shifting the signal to higher m/z. Neither of these disadvantages, however, applies to typical analyses of therapeutic mAbs, because sample is usually abundant, and resolution is more often limited by isotopic spread than by instrument resolution.

Finally, determining the intact MS as described herein in either native or denaturing conditions provides a clear qualitative and quantitative survey of all the proteoforms distinguishable by mass, thereby helping to identify which modifications need to be looked for in complementary bottom-up or middle-down data. The future analysis of protein therapeutics and plasma proteins is likely to rely on hybrid MS methods, complemented by advanced bioinformatics methods to analyze and integrate the data from each of the information channels.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of identifying or characterizing at least one property of a sample, the method comprising the steps of:
   receiving a measured mass over charge (m/z) spectrum for the sample and determining if parsimony weighting is indicated;
   performing parsimony weighting if parsimony weighting is indicated by:
      setting charge assignments for a number of bins of the measured m/z spectrum based on a deconvolution of the measured m/z spectrum;
      applying parsimony weighting to adjust the charge assignments to a reduced number of charges;
      generating an intermediate neutral mass spectrum using the adjusted charge assignments;
      determine a parsimonious neutral mass spectrum after the intermediate neutral mass spectrum either converges or after a predetermined number of iterations; and
   using the parsimonious neutral mass spectrum to identify or characterize at least one property of the sample.

2. The method of claim 1, wherein determine if parsimony weighting is indicated comprises automatically determining if parsimony weighting is indicated based on the m/z spectrum.

3. The method of claim 1, wherein determine if parsimony weighting is indicated comprises manually determining if parsimony weighting is indicated based on input from a user.

4. The method of claim 1, wherein applying parsimony weighting comprises re-weighting the charge assignments to reduce how many different charges are included.

5. The method of claim 1, wherein applying parsimony weighting further comprising estimating a minimum expected number of molecules.

6. The method of claim 1, wherein the parsimony weighting is based on one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum.

7. The method of claim 1, wherein applying parsimony weighting comprises identifying a number of harmonic relationships in the deconvolution of the measured m/z spectrum and assigning a minimum number of molecules to achieve the identified number of harmonic relationships.

8. The method of claim 1, wherein applying parsimony weighting comprises identifying a number of off-by-one relationships in the deconvolution of the m/z spectrum and selecting charge assignments to adjust based on the identified off-by-one relationships.

9. The method of claim 1, wherein generating the intermediate neutral mass spectrum comprises multiplying m/z values from the spectrum by the charges and subtracting masses of charge carriers to determine a neutral mass.

10. The method of claim 1, wherein generating the intermediate neutral mass spectrum comprises deconvoluting the measured m/z spectrum using the reduced number of charges.

11. The method of claim 1, wherein the measured m/z spectrum comprises electrospray mass spectral data.

12. The method of claim 1, wherein using the parsimonious neutral mass spectrum to identify or characterize at least one property of the sample comprises determining the intact mass of large molecules in the sample.

13. A non-transitory computer-readable storage medium storing a set of instructions capable of being executed by a processor, that when executed by the processor causes the processor to:
   receive a measured mass over charge (m/z) spectrum for the sample and determine if parsimony weighting is indicated;
   perform parsimony weighting if parsimony weighting is indicated by:
      setting charge assignments for a number of bins of the measured m/z spectrum based on a deconvolution of the measured m/z spectrum;
      applying parsimony weighting to adjust the charge assignments to a reduced number of charges;
      generating an intermediate neutral mass spectrum using the adjusted charge assignments;
      determine a parsimonious neutral mass spectrum after the intermediate neutral mass spectrum either converges or after a predetermined number of iterations; and using the parsimonious neutral mass spectrum to identify or characterize at least one property of the sample.

14. The non-transitory computer-readable storage medium of claim 13, wherein the set of instructions cause the processor to re-weight the estimated charge states to reduce the estimated number of different charges when applying parsimony weighting.

15. The non-transitory computer-readable storage medium of claim 13, wherein the set of instructions cause the processor to estimate a minimum expected number of molecules when applying parsimony weighting.

16. The non-transitory computer-readable storage medium of claim 13, wherein the set of instructions cause the processor to apply parsimony weighting based on identifying one or more of: a number of intense peaks from the deconvolution of the measured m/z spectrum, a smoothness of the deconvolution of the measured m/z spectrum, a number of harmonic relationships in the deconvolution of the measured m/z spectrum, and a number of off-by-one relationships in the deconvolution of the m/z spectrum.

17. The non-transitory computer-readable storage medium of claim 13, wherein the set of instructions cause the processor to identify a number of harmonic relationships in the deconvolution of the measured m/z spectrum and assign a minimum number of molecules to achieve the identified number of harmonic relationships when applying parsimony weighting.

18. The non-transitory computer-readable storage medium of claim 13, wherein the set of instructions cause the processor to identify a number of off-by-one relationships in the deconvolution of the m/z spectrum and select estimated charge states based on the identified off-by-one relationships when applying parsimony weighting.

19. The non-transitory computer-readable storage medium of claim 13, wherein the set of instructions cause the processor to multiply m/z values from the spectrum by the estimated charges and subtract masses of the charge carriers to determine a neutral mass when generating the intermediate neutral mass spectrum.

20. The non-transitory computer-readable storage medium of claim 13, wherein the set of instructions cause the processor to deconvolute the measured mass over charge (m/z) spectrum using the reduced number of estimated charge states when generating the intermediate neutral mass spectrum.

21. The non-transitory computer-readable storage medium of claim 13, wherein the set of instructions cause the processor to determine the intact mass of large molecules in the sample when using the parsimonious neutral mass spectrum to identify or characterize at least one property of the sample.

* * * * *